(12) United States Patent
Nishikawa et al.

(10) Patent No.: US 7,267,411 B2
(45) Date of Patent: Sep. 11, 2007

(54) BRAKE SYSTEM FOR A MOTORCYCLE, AND METHOD OF USING SAME

(75) Inventors: Yutaka Nishikawa, Saitama (JP); Kazuhiko Tani, Saitama (JP); Hideo Takahashi, Saitama (JP); Takehiko Nanri, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 182 days.

(21) Appl. No.: 11/041,531

(22) Filed: Jan. 24, 2005

(65) Prior Publication Data
US 2005/0168059 A1  Aug. 4, 2005

(30) Foreign Application Priority Data
Jan. 30, 2004 (JP) ............................. 2004-024045

(51) Int. Cl.
*B60T 13/00* (2006.01)

(52) U.S. Cl. .................. 303/9.64; 303/137; 303/115.2

(58) Field of Classification Search .................... 303/3, 303/6.01, 9.61, 9.64, 15, 137, 115.2, 9.62
See application file for complete search history.

(56) References Cited
U.S. PATENT DOCUMENTS 4,626,038 A * 12/1986 Hayashi et al. ............ 303/9.64
5,249,848 A * 10/1993 Matsuto et al. ............ 303/163
5,257,856 A * 11/1993 Ota et al. ................... 303/198
5,297,859 A * 3/1994 Suzuki et al. ............... 303/137
5,416,708 A * 5/1995 Matsuto et al. ............... 701/71
5,577,816 A * 11/1996 Suzuki et al. ................ 303/174
6,089,682 A * 7/2000 Ishikawa et al. ............ 303/163

FOREIGN PATENT DOCUMENTS
JP          05039008 A     2/1993

* cited by examiner

*Primary Examiner*—Devon Kramer
(74) *Attorney, Agent, or Firm*—Carrier, Blackman & Associates, P.C.; William D. Blackman; Joseph P. Carrier

(57) ABSTRACT

A brake system includes a front and a rear wheel brake circuit which are independent of each other. Each circuit includes: a master cylinder connected to a brake caliper through the main brake line; a hydraulic pressure modulator which causes an electrically-operated motor to generate hydraulic pressure; and a normally-open electromagnetic on-off valve. When the two brake circuits are moved in response to operation of a braking operation unit in one circuit, in the brake circuit for which a braking operation unit was operated earlier, the electromagnetic on-off valve opens so that the brake caliper is operated by use of hydraulic pressure from the master cylinder. In the other brake circuit, the electromagnetic on-off valve is closed so that the brake caliper is operated by use of hydraulic pressure from the hydraulic pressure modulator. The braking system uses simple wheel braking mechanism and piping, and concurrently reduces electric current consumption.

11 Claims, 15 Drawing Sheets

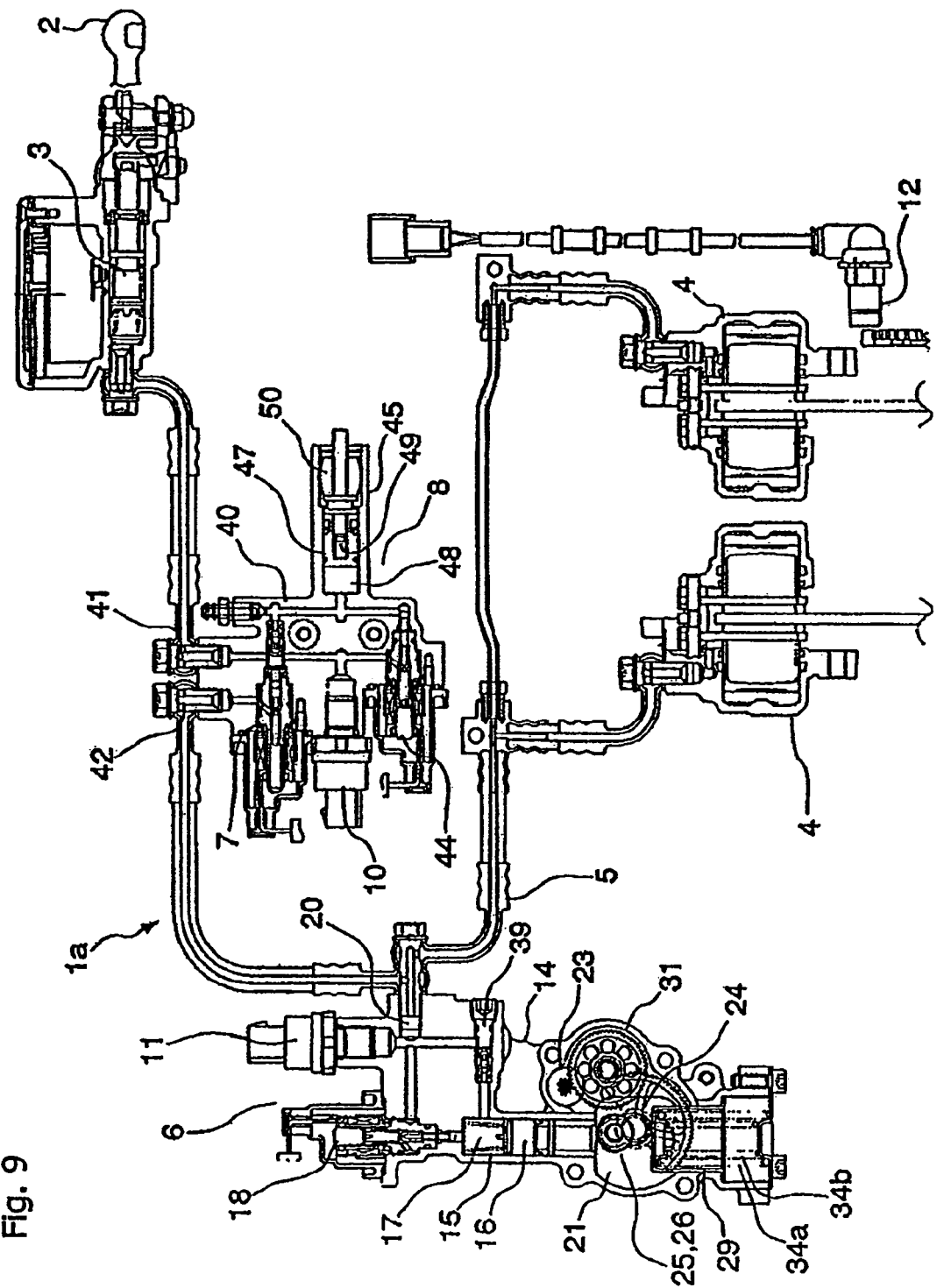

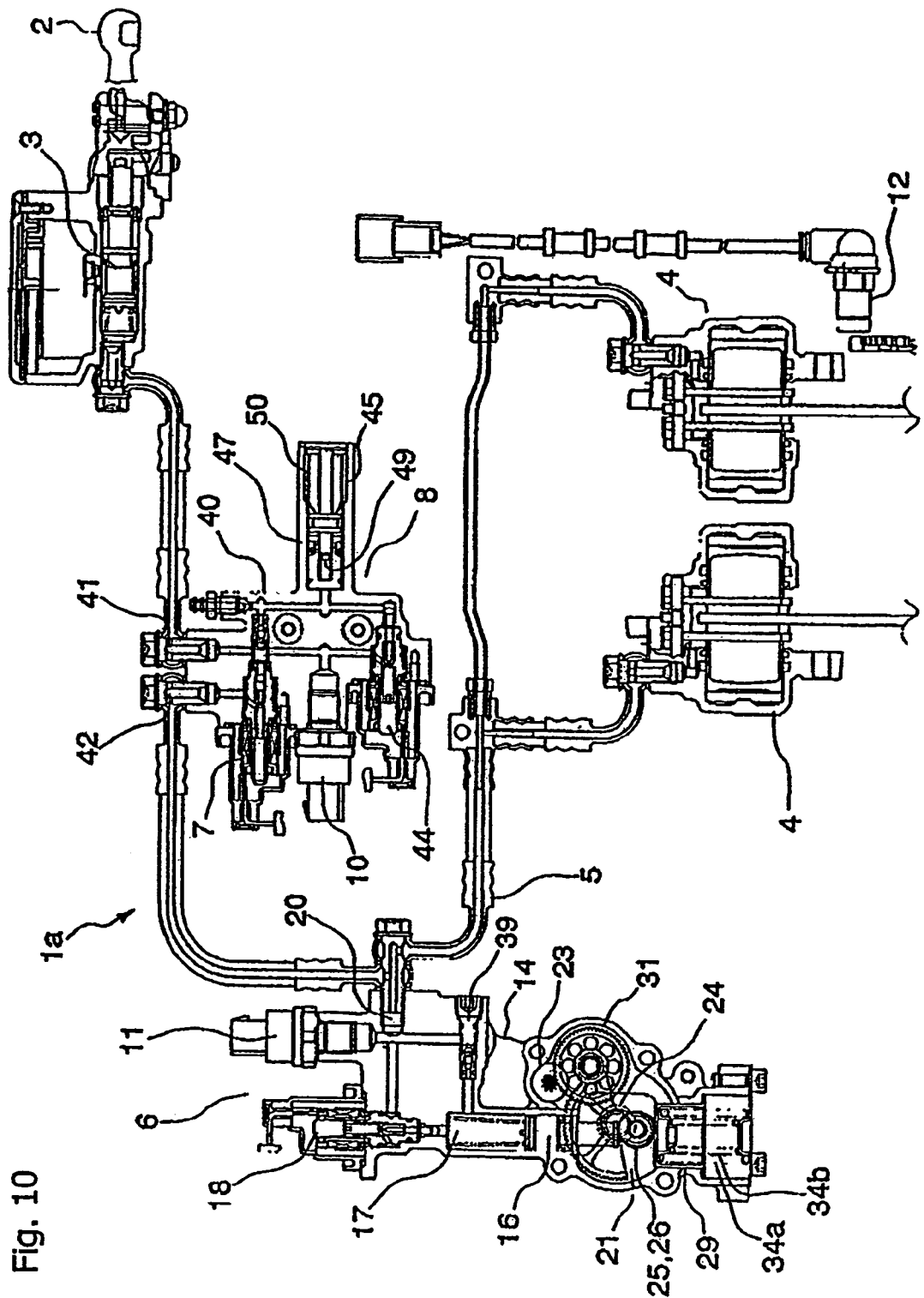

| —— | CHARACTERISTIC OF BRAKING FORCE AT REAR WHEEL WHEN INCREASING BRAKING FORCE AT FRONT WHEEL |
| —·—·— | CHARACTERISTIC OF BRAKING FORCE AT REAR WHEEL WHEN DECREASING BRAKING FORCE AT FRONT WHEEL |

PRIOR ART

BRAKE SYSTEM FOR A MOTORCYCLE, AND METHOD OF USING SAME

CROSS-REFERENCE TO RELATED APPLICATIONS

The present invention claims priority under 35 USC 119 based on Japanese patent application No. 2004-024045, filed on Jan. 30, 2004. The subject matter of these priority documents is incorporated by reference herein.

BACKGROUND OF THE INVENTION

1. Field of the Invention

The present invention relates to a brake system for a motorcycle, and particularly to a brake system for a motorcycle which causes wheel braking mechanism of the front wheel and wheel braking mechanism of the rear wheel to move in response to each other by use of an appropriate output ratio depending on driving conditions and a braking operation of the motorcycle.

2. Description of the Background Art

A brake system employing what is called a by-wire method (hereinafter referred to as a "by-wire method") is known in the art. According to this type of brake system, an amount of operation of a braking operation unit, such as a hand lever or foot pedal, is detected electrically. Based on the detected value, the wheel braking mechanism, such as a wheel caliper, is operated by hydraulic pressure which has been generated by a hydraulic pressure modulator. An example of this type of brake system is described in Japanese Patent Laid-open Official Gazette No. Hei. 5-39008. The brake system disclosed in Japanese Patent Laid-open Official Gazette No. Hei. 5-39008 has the following schematic configuration.

Specifically, with regard to this type of brake system, a hydraulic pressure modulator which generates hydraulic pressure by use of an electric pump (electrically-operated actuator), a reservoir, a control valve and the like are merged and connected with a main brake line connecting wheel cylinders (wheel braking mechanism) of the respective wheels and a master cylinder which moves in response to a brake pedal (braking operation unit). In addition, a normally-open-type electromagnetic on-off valve is provided in a position in the main brake line. The position of the electromagnetic on-off valve is located toward the master cylinder from a portion in which the main brake line and the hydraulic pressure modulator are connected with each other. The electromagnetic on-off valve is a fail safe device. The electromagnetic on-off valve is energized, and blocks the path between the electromagnetic valve and the master cylinder, while a regular braking operation is performed. In addition, hydraulic pressure is generated by the hydraulic pressure modulator. The hydraulic pressure is generated corresponding to a detection value which has been found by electrically detecting an amount of operation of the brake pedal, and to other driving conditions of the vehicle.

Furthermore, this type of brake system can be provided with a hydraulic pressure modulator corresponding to the wheel cylinder of each wheel, thereby enabling hydraulic pressure and the like supplied to each wheel cylinder to be adjusted in an arbitrary manner.

However, in the conventional brake system, while a regular braking operation is performed except for fail safe, the master cylinder is designed to be cut off from the main brake line by an ON operation of the electromagnetic on-off valve. Concurrently, all of the wheel braking mechanism are designed to be operated by use of hydraulic pressure which has been generated by the hydraulic pressure modulator. For this reason, electric current is constantly consumed while the braking operation is performed due to is use in the ON operation of the electromagnetic on-off valve and to its use in the operation of all hydraulic pressure modulators.

For this reason, if the electromagnetic brake as described above were employed in a motorcycle brake system, the battery and the generator would need to be constructed in a larger size. This is an undesireable situation for the motorcycle which is required to be smaller in size and lighter in weight.

For motorcycles, a Combined Brake System, hereinafter referred to as a "CBS", has been developed. This system causes the wheel braking mechanism of the front wheel and the wheel braking mechanism of the rear wheel to move in response to an operation of a brake operating unit of one of the circuits by use of an appropriate output ratio depending on driving conditions and a braking operation of the motorcycle. Thus, the wheel braking mechanism of the front wheel and the wheel braking mechanism of the rear wheel is operated, even when any single one of the front wheel brake and the rear wheel brake is operated.

In order to realize this system without complicating the wheel braking mechanism and piping, adoption of the aforementioned by-wire method has been brought to attention. Specifically, in the by-wire method, a front wheel brake circuit and a rear wheel brake circuit are completely independent of each other, thereby enabling the wheel braking mechanism of each of the two brake circuits to be controlled in an arbitrary manner while reflecting an amount of braking operation and driving conditions which have been electrically detected. For this reason, a piston exclusively for causing the two wheel braking mechanism to move in response to each other needs not be added to each of the two wheel braking mechanism. In addition, piping exclusively for causing the two wheel braking mechanism to move in response to each other needs not be added to each of the two wheel braking mechanism. Accordingly, with regard to this type of brake system, a problem to be solved is how electric current consumption can be reduced while advantages of the by-wire method are employed.

Furthermore, it has been considered that an anti-lock brake system (hereinafter referred to as an "ABS") is fitted into brake systems for motorcycles in addition to the aforementioned CBS being fitted thereinto. A main task of the CBS is to actively supply hydraulic fluid to the main brake line depending on an input signal. By contrast, a main task of the ABS is to decrease, maintain, and again increase, hydraulic pressure in the main brake line depending on an input signal. For this reason, normally, a hydraulic pressure modulator exclusive for the CBS, and a separate hydraulic pressure modulator exclusive for the ABS are fitted into the brake system. If, however, the hydraulic pressure modulator exclusive for the CBS and the hydraulic pressure modulator exclusive for the ABS were to be fitted into the brake system for motorcycles, not only would the number of parts increase, but also bulkiness and extra weight would be introduced into the brake system. Accordingly, it is desirable that a single hydraulic pressure modulator is used as a component for performing a plurality of functions related to controlling hydraulic pressures.

With this taken into consideration, an object of the present invention is to realize a CBS without complicating the wheel braking mechanism and the piping, and without increasing the electric current consumption, and further to accordingly provide a brake system for a motorcycle which is smaller in size and lighter in weight.

In addition, another object of the present invention is to make a single hydraulic pressure modulator available as a component for performing a plurality of functions related to controlling hydraulic pressures without complicating the structure of the hydraulic pressure modulator, and to accordingly provide a brake system for a motorcycle which is smaller in size and lighter in weight.

In order to achieve the aforementioned objectives, according to a first aspect of the present invention, a front wheel brake circuit and a rear wheel brake circuit are provided independently of each other. Each of these brake circuits is configured to include: a master cylinder which moves in response to a braking operation unit of each wheel; wheel braking mechanism for applying braking force to a corresponding wheel by hydraulic pressure operation; a main brake line through which the master cylinder and the wheel braking mechanism are connected with each other; a hydraulic pressure modulator for causing an electrically-operated actuator to generate hydraulic pressure depending on driving conditions and a braking operation of the vehicle, and for supplying the hydraulic pressure to the main brake line and discharging the hydraulic pressure from the main brake line while the hydraulic pressure modulator is merged and connected with the main brake line; and an electromagnetic on-off valve which is provided in a position in the main brake line, the position being located toward the master cylinder from the portion where the main brake line and the hydraulic pressure modulator are merged and connected with each other. The electromagnetic on-off valve controls the communicative connection and cutoff between the master cylinder and the wheel braking mechanism.

In the brake system of a motorcycle, the electromagnetic on-off valve and the electrically-operated actuator of each of the two brake circuits are controlled depending on driving conditions and a braking operation of the vehicle, thereby causing the wheel braking mechanism of the two respective brake circuits to move in response to each other, and to be operated, by use of an arbitrary output ratio. In the brake system for a motorcycle, when the wheel braking mechanism of the two respective brake circuits are intended to be caused to move in response to each other and to be operated, the electromagnetic on-off valve is designed to be caused to open so that the wheel braking mechanism is operated by use of hydraulic pressure from the master cylinder, in a brake circuit connected to one braking operation unit which has been operated earlier than the other braking operation unit. In the other brake circuit, the electromagnetic on-off valve is designed to be caused to close so that the wheel braking mechanism is operated by use of hydraulic pressure from the hydraulic pressure modulator.

In a brake system that is configured in the aforementioned manner, hydraulic pressure generated by the master cylinder is supplied directly to wheel braking mechanism connected to a braking operation unit which has been operated earlier than the other braking operation unit. Furthermore, hydraulic pressure generated by the hydraulic pressure modulator is supplied to the other wheel braking mechanism by use of the by-wire method. Consequently, according to the CBS of this system, hydraulic pressure is generated by the electrically-operated actuator only in a brake circuit connected to a braking operation unit which has been operated later than the other braking operation unit. In addition, at this time, the electromagnetic on-off valve is energized only in one of the two brake circuits.

A brake system for a motorcycle according to a second aspect of the present invention has the same configuration as the brake system for a motorcycle according to the first aspect of the invention, except for the following addition. The hydraulic pressure modulator is configured to include a piston which receives force from the electrically-operated actuator, and which accordingly moves back and forth in a cylinder. The inside of the cylinder is divided into two areas by a position almost in the center of the cylinder. When the piston is positioned in this generally central position, it is considered to be in a neutral reference position. In use, the piston is to be caused to operate in one area and the other area of the two areas respectively. Different modes of control of the hydraulic pressure are characterized by operation of the piston in one area and operation of the piston in the other area, respectively.

In a brake system for a motorcycle configured in the aforementioned manner, the piston is controlled in the two operation areas separated by the neutral reference position, thereby enabling the single hydraulic pressure modulator to be used as a component for performing two separate functions of controlling hydraulic pressures.

A brake system according to a third aspect of the present invention has the same configuration as the brake system according to the second aspect of the present invention, except for the following addition. The piston separates and forms a hydraulic pressure chamber in the cylinder. An operation area of the piston where the hydraulic pressure chamber is expanded by displacement of the piston from the neutral reference position is designed to be used for the anti-lock brake control (ABS control). The other operation area of the piston is designed to be used for control for causing the wheel braking mechanism of the two respective brake circuits to move in response to each other (CBS control).

In a brake system configured in the aforementioned manner, according to the ABS control, control of hydraulic pressure such as decompression, maintenance and re-compression is performed by causing the piston to start operating from the neutral reference position in a direction which expands the volume of the hydraulic pressure chamber. Furthermore, according to the CBS control, hydraulic fluid is supplied to, and discharged from, the main brake line by causing the piston to start operating from the neutral reference position in a direction which reduces the volume of the hydraulic pressure chamber.

A brake system according to a fourth aspect of the present invention has the same configuration as the brake system according to the third aspect of the present invention, except for the following addition. The hydraulic pressure modulator includes energizing means for applying a force to the piston in a direction which reduces the volume of the hydraulic pressure chamber, and a stopper for controlling displacement of the piston by the energizing means at the neutral reference position. Thereby, if the electrically-operated actuator of the hydraulic pressure modulator is stopped from being energized while the ABS control is performed, the piston is designed to be returned to the neutral reference position by the energizing means and the stopper.

In a brake system configured in the aforementioned manner, the piston is returned to the neutral reference position by the energizing means and the stopper without an electric power supply when the electrically-operated actuator is stopped from being energized in the course of the ABS control.

A brake system according to a fifth aspect of the present invention has the same configuration as the brake system according to the fourth aspect of the present invention, except for the following addition. An electromagnetic on-off valve of normally-closed type is provided between the hydraulic pressure chamber and the main brake line. In addition, a bypass path which bypasses the electromagnetic on-off valve, and through which the hydraulic pressure chamber and the main brake line are connected to each other, is provided. Furthermore, the bypass path is provided with a check valve which allows hydraulic fluid to flow from the hydraulic pressure chamber to the main brake line.

In a brake system configured in the aforementioned manner, the electromagnetic on-off valve is closed while being stopped from being energizing, thereby blocking the flow of hydraulic fluid from the main brake line to the hydraulic pressure chamber. However, the flow of hydraulic fluid from the hydraulic pressure chamber to the main brake line is secured by the check valve and the bypass path. Accordingly, even if the energizing is stopped in the course of the ABS control, excess hydraulic fluid which remains in the hydraulic pressure chamber would be returned to the main brake line.

According to the first aspect of the present invention, hydraulic pressure which has been generated by the master cylinder is supplied to the wheel braking mechanism, in a brake circuit connecting to a braking operation unit which has been operated earlier than the other braking operation unit. In the other brake circuit connecting to a braking operation unit which has been operated later, hydraulic pressure which has been generated by the hydraulic pressure modulator is supplied to the wheel braking mechanism by the by-wire method. Thereby, electric current consumption by the electrically-operated actuator can be largely reduced in comparison with a case where hydraulic pressure which has been generated by the hydraulic pressure modulator is supplied to both brake circuits. In addition, an electromagnetic on-off valve in only one of the two brake circuits may be energized while the CBS control is performed. Accordingly, electric current consumption by the electromagnetic on-off valve can be also reduced. Consequently, the present invention enables the CBS to be realized without complicating the wheel braking mechanism and piping, and without introducing bulkiness and extra weight associated with a larger battery and generator.

In addition, according to the second aspect of the present invention, the piston is controlled in the two operation areas which are separated by the neutral reference position. Thus, the single hydraulic pressure modulator is used as a component for performing two separate functions of controlling hydraulic pressures. Accordingly, the whole of the system is smaller in size and lighter in weight, which is advantageous for a system being mounted onto a motorcycle.

According to the third aspect of the present invention, the control of hydraulic pressure for the ABS and the control of hydraulic pressure for the CBS are realized by the single hydraulic pressure modulator without causing trouble.

According to the fourth aspect of the present invention, even if the electrically-operated actuator is stopped from being energized while the ABS control is performed, the piston is returned to the neutral reference position. Accordingly, the piston can be ready for the next control of the ABS and the CBS.

According to the fifth aspect of the present invention, even if the energizing is stopped while the ABS control is performed, hydraulic fluid in the hydraulic pressure chamber can be returned to the main brake line. Accordingly, the fail safe to be performed while the ABS control is performed can be realized with a simple structure.

Modes for carrying out the present invention are explained below by reference to an embodiment of the present invention shown in the attached drawings. The above-mentioned object, other objects, characteristics and advantages of the present invention will become apparent form the detailed description of the embodiment of the invention presented below in conjunction with the attached drawings.

BRIEF DESCRIPTION OF THE DRAWINGS

FIG. 9 is a diagram of a braking circuit at a front wheel for the embodiment of FIG. 1 showing hydraulic fluid pathways between braking system components for the braking system in a CBS operation.

FIG. 10 is a diagram of a braking circuit at a front wheel for the embodiment of FIG. 1 showing hydraulic fluid pathways between braking system components for the braking system in an ABS operation.

DETAILED DESCRIPTION

Figure 1:
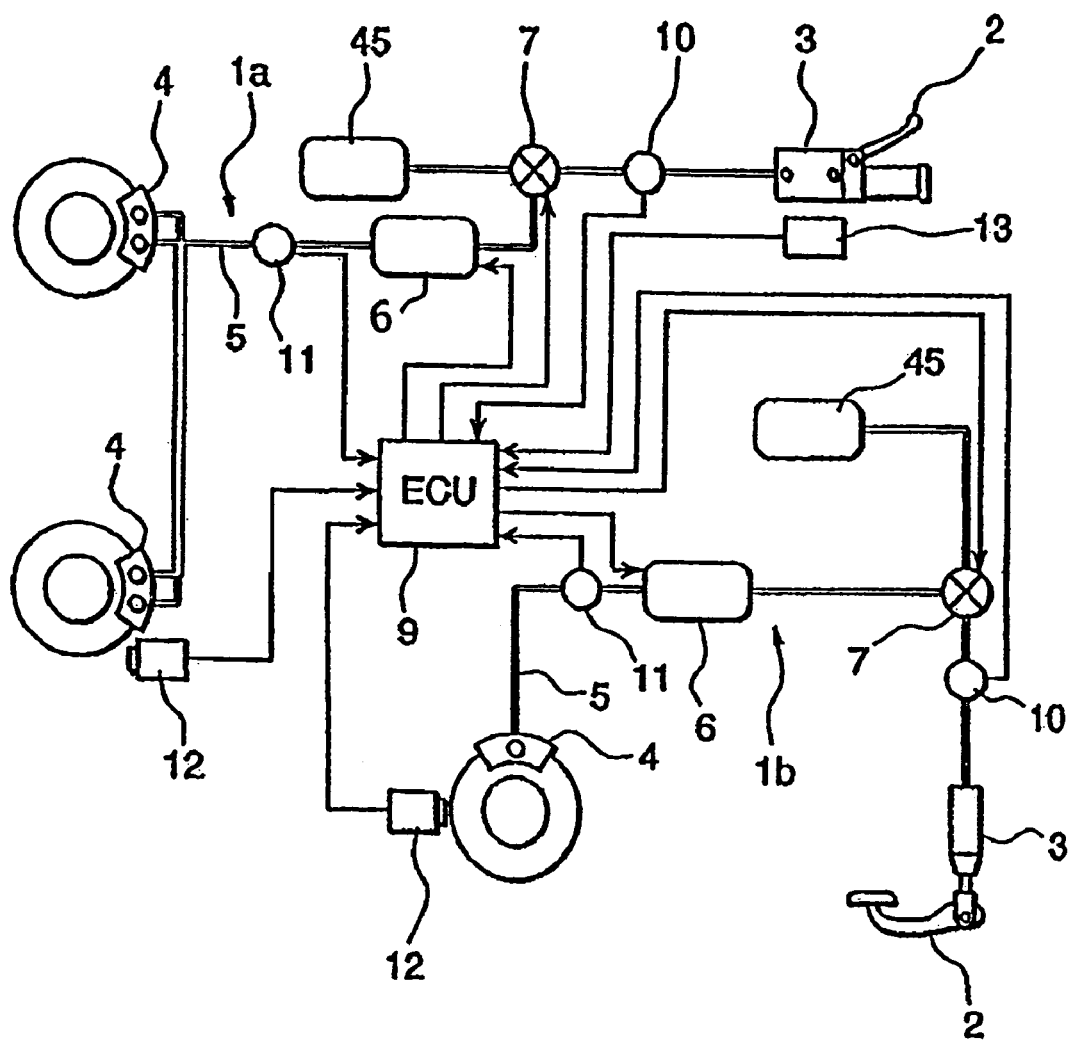
FIG. 1 is a schematic view of the combined brake system showing an embodiment of the present invention.
Figure 2:
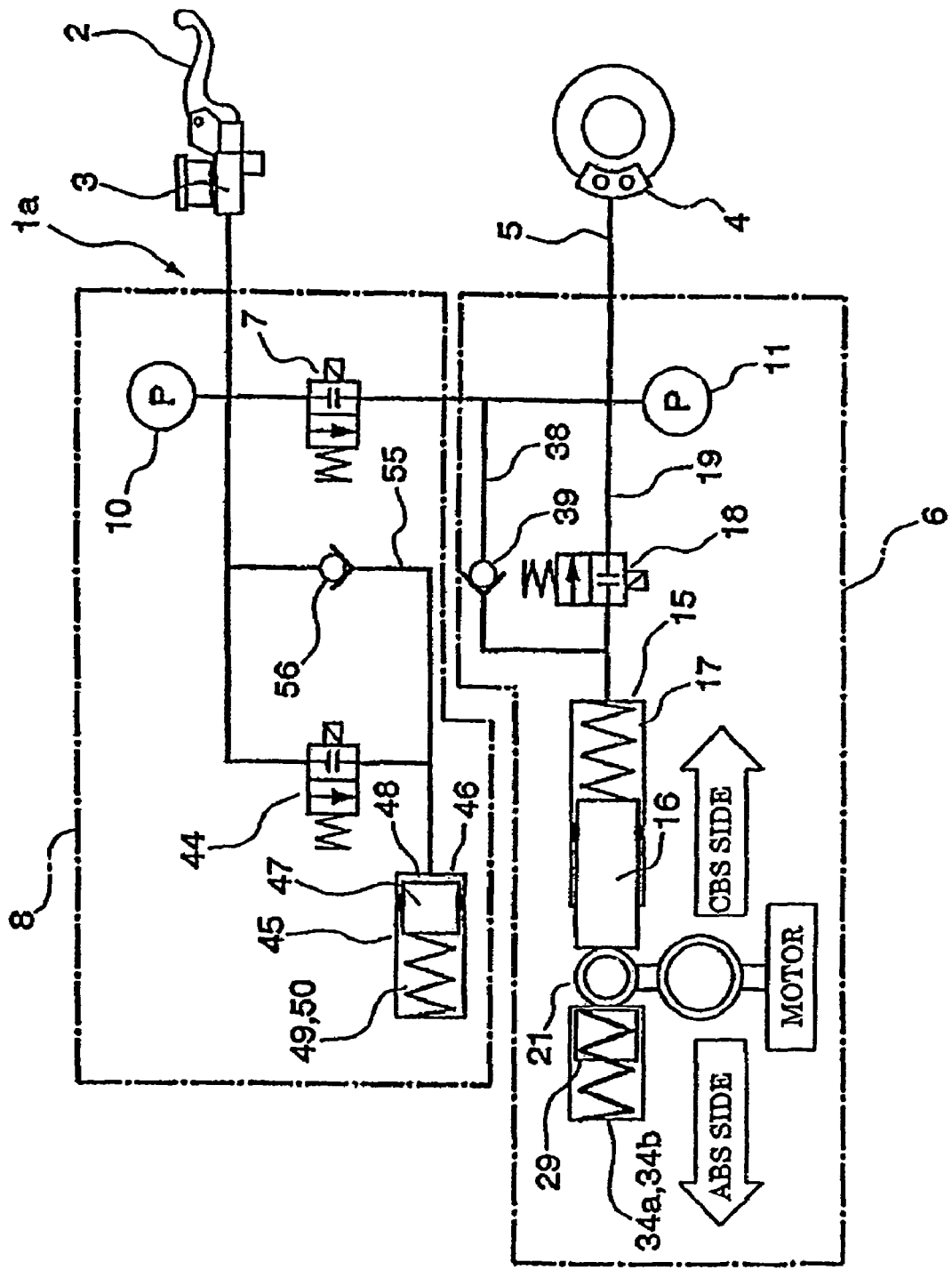
FIG. 2 is a schematic view of a braking circuit at a front wheel for the embodiment of FIG. 1.

Next, descriptions will be provided for an embodiment of the present invention with reference to the drawings. FIG. 1 shows an overall configuration of a brake system according to an embodiment of the present invention. The brake system according to the present embodiment includes a front wheel brake circuit 1a and a rear wheel brake circuit 1b which are independent of each other as shown in FIG. 1. According to the present embodiment, the front wheel brake circuit 1a and the rear wheel brake circuit 1b are different from each other in that a braking operation unit 2 for the front wheel employs a lever and a braking operation unit 2 for the rear wheel employs a pedal. Except for this, however, the front wheel brake circuit 1a and the rear wheel brake circuit 1b have almost the same basic configuration. In the following descriptions of the specific circuit configuration, detailed descriptions will be provided only for the front wheel brake circuit 1a. For the rear wheel brake circuit 1b, overlapped descriptions will be omitted by assigning the same reference numerals to the same components as has the front wheel brake circuit 1a.

In each of the brake circuits 1a and 1b, a master cylinder 3 moves in response to the braking operation unit 2. A brake caliper 4, which is the wheel braking mechanism corresponding to the master cylinder 3, is connected to master cylinder 3 through a main brake line 5. In a middle portion of the main brake line 5, a hydraulic pressure modulator 6 is merged and connected with the main brake line 5. The hydraulic pressure modulator 6 causes an electrically-operated actuator to generate hydraulic pressure, and is described below. In addition, a first normally-open electromagnetic on-off valve 7 is interposed between the master cylinder 3 and the brake caliper 4 in a position in the main brake line 5. The position is toward the master cylinder 3 from the position where the main brake line 5 and the hydraulic pressure modulator 6 are merged and connected with each other. The first electromagnetic on-off valve 7 controls the connection and cutoff between the master cylinder 3 and the brake caliper 4.

Each of the brake circuits 1a and 1b further include a reaction force modulator 45 connected to the main brake line 5. The reaction force modulator causes a pseudo reaction force against the hydraulic pressure to function on the master cylinder 3 corresponding to an amount of operation of the braking operation unit 2 upon necessity while the electromagnetic on-off valve 7 closes the main brake line 5.

The electrically-operated actuator in the hydraulic pressure modulator 6 and the first electromagnetic on-off valve 7, along with other valves and equivalents included in the hydraulic pressure modulator 6 and the like, are designed to be electrically controlled by a controller (ECU) 9.

It should be noted that the controller 9 is connected with a pressure sensor 10 for detecting hydraulic pressure on the input side (the side in the direction of the master cylinder 3 from the first electromagnetic on-off valve 7) of each of the brake circuits 1a and 1b. The same controller 9 is connected with pressure sensor 11 for detecting hydraulic pressure on the output side (the side in the direction of the brake caliper 4 from the first electromagnetic on-off valve 7) of each of the brake circuits 1a and 1b. The same controller 9 is also connected with wheel speed sensors 12 for detecting the respective wheel speeds of the front and rear wheels. In addition, the same controller 9 is connected with a mode-changing switch 13 (mode-changing means) and the like through which control modes are changed by a manual operation of the rider of the motorcycle. The same controller 9 controls the braking pressures of the respective brake calipers 4 depending on input signals from these sensors and signals for changing modes.

This type of brake system includes a combined brake system (CBS) having the following function: when any one of the braking operation unit 2 for the front wheel and the braking operation unit 2 for the rear wheel is operated, the CBS causes the brake caliper 4 corresponding to the other braking operation unit 2, to move in response to the operated braking operation unit 2. A brake caliper 4 associated with a braking operation unit 2 which was operated later than the other braking operation unit 2 is operated by pressure which has been supplied from the hydraulic pressure modulator, by use of a by-wire method.

In other words, when one of the two braking operation units 2 is operated, information concerning the wheel speed of each of the front and rear wheels, an amount of the braking operation and the like is inputted into the controller 9 through the corresponding sensors. Thereafter, a command from the controller 9 causes the first electromagnetic on-off valve 7 in the brake circuit leading to the other of the two braking operation units 2 to close the main brake line 5. Simultaneously with this, the hydraulic pressure modulator 6 supplies hydraulic pressure to the brake caliper 4 in the brake circuit depending on driving conditions and an amount of the braking operation. However, hydraulic pressure is supplied from the hydraulic pressure modulator 6 to the brake circuit leading to the braking operation unit which has not been operated in this manner, only when the mode-changing switch 13, which will be described in detail later, is set at a mode which allows the CBS.

On the other hand, in the brake circuit leading to a braking operation unit 2 which has been operated earlier than the other brake operation lever 2, hydraulic pressure which has been generated in the master cylinder 3 is supplied directly to the brake caliper 4. In other words, when the controller 9 determines through the pressure sensors 10 that one braking operation unit 2 has been operated earlier than the other braking operation unit 2, the first electromagnetic on-off valve 7 is maintained in a non-energized condition. As a result, hydraulic pressure from the master cylinder 3 is supplied to the brake caliper 4 through the main brake line 5.

The CBS in this brake system controls hydraulic pressure in the brake circuit leading to the braking operation unit 2, which has been operated subsequent to the other braking operation unit 2, by use of the by-wire method. Consequently, this enables the front and rear wheel brakes to move in response to each other by use of the respective optimal hydraulic pressures without constructing the brake caliper 4 and piping in a complicated manner. In addition, in the brake circuit leading to the braking operation unit 2 which has been operated previous to the other braking operation unit 2, hydraulic pressure from the master cylinder 3 is supplied directly to the brake caliper 4. For this reason, the hydraulic pressure modulator 6 in the brake circuit (the electrically-operated actuator included in the brake circuit) can be held in suspension. This enables this brake system to put at least one of the two hydraulic pressure modulators 6 (the electrically-operated actuators included therein) in a suspended condition, thus enabling the electric current consumption to be curbed securely.

In addition, the first electromagnetic on-off valve 7 installed in the main brake line 5 is of normally-open type. This enables the first electromagnetic on-off valve 7 to be put in a non-energized state while the motorcycle is driven under normal conditions or the like. Consequently, from this viewpoint, the electric current consumption of the vehicle can be curbed to a large extent.

It should be noted that the above descriptions have been provided for the brake system that is operating while a braking operation is performed for a relatively short time. This brake system is designed to be shifted to a mode which further suppresses the electric current consumption while a braking operation is performed for a longer time such as while stopping the vehicle on a slope. This mode for suppressing the electric current consumption will be described later.

Descriptions will now be provided for a specific structure and specific functions of the hydraulic pressure modulator 6 with reference to FIGS. 2 to 10.

Figure 3:
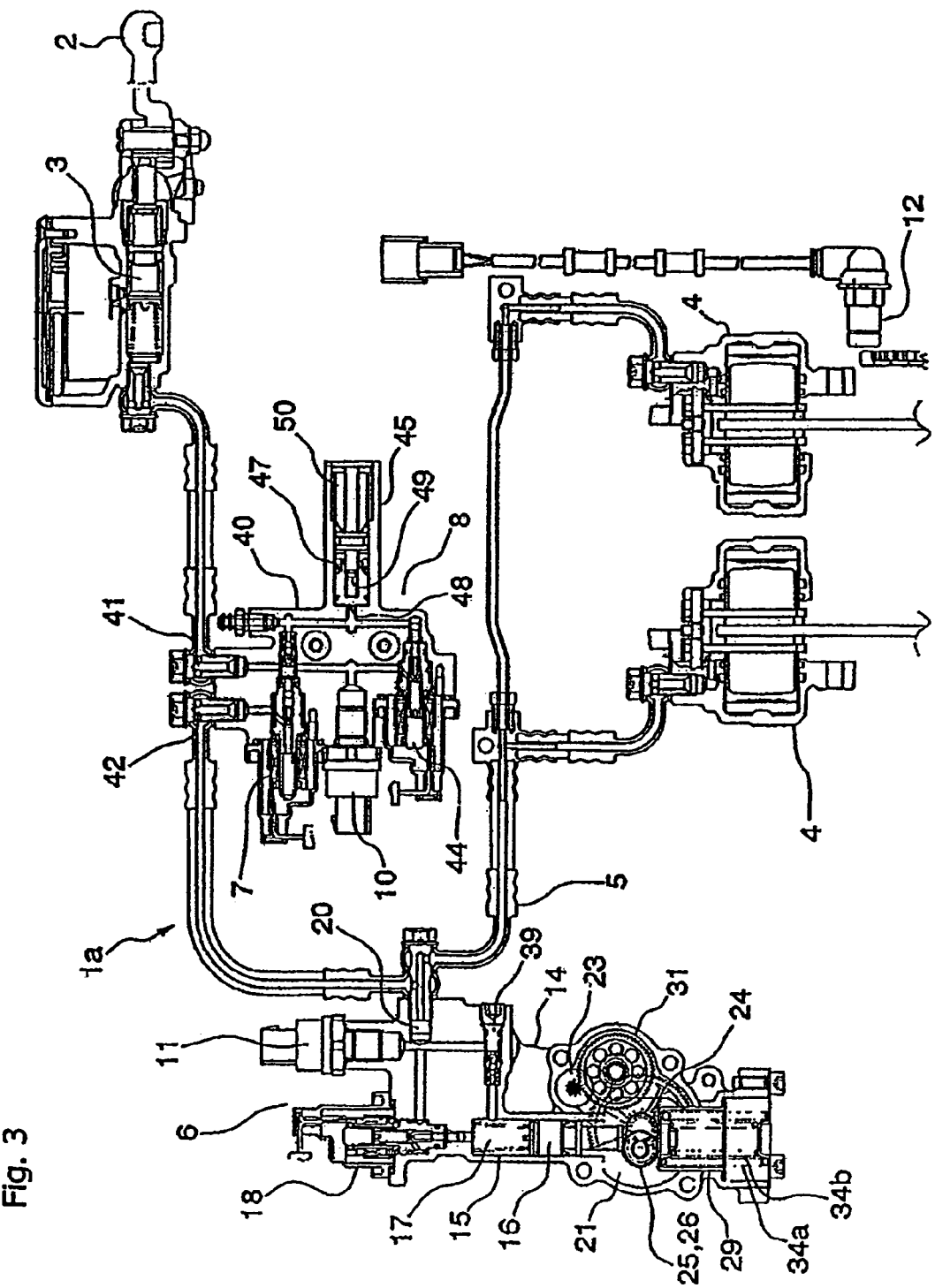
FIG. 3 is a diagram of a braking circuit at a front wheel for the embodiment of FIG. 1 showing hydraulic fluid pathways between braking system components.
Figure 4:
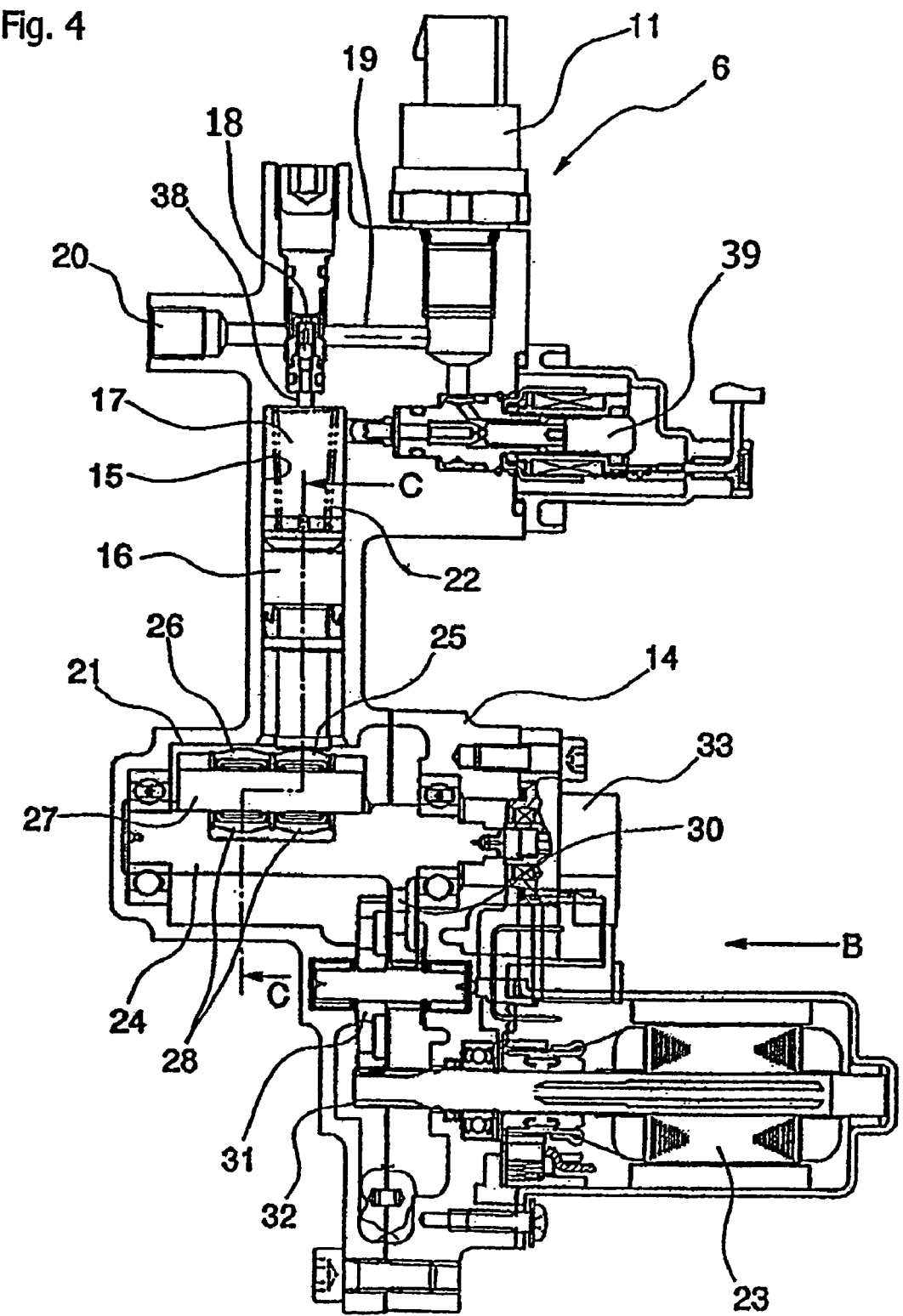
FIG. 4 is an enlarged sectional view of the hydraulic pressure modulator taken along the dashed line A-A in FIG. 5 showing the piston in a neutral position within the hydraulic pressure chamber.
Figure 5:
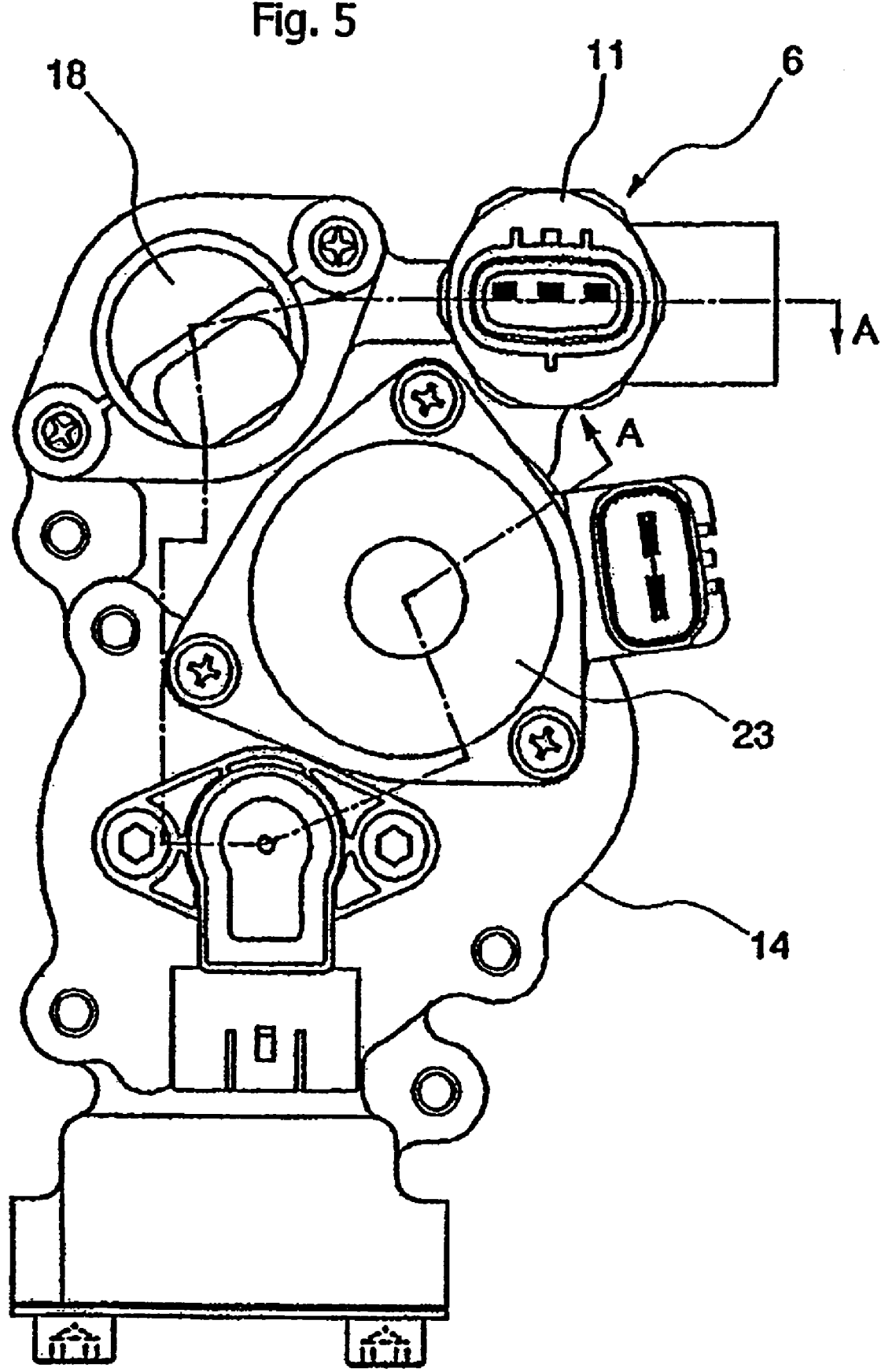
FIG. 5 is a side view of the hydraulic pressure modulator as is seen from the direction of the arrow B in FIG. 4 showing the second electromagnetic on-off valve, the pressure sensor, and the motor lying in parallel.

As shown in the enlarged, cross-sectional view of the hydraulic pressure modulator 6 in FIG. 4, a piston 16 is housed in a cylinder 15 which has been formed in a modulator body 14 in a way that the piston 16 can move back and forth in the cylinder 15, and a hydraulic fluid chamber 17 is separated by, and formed by, the cylinder 15 and the piston 16. This hydraulic pressure chamber 17 is connected to an output port 20 of the modulator body 14 through a main supply-discharge path 19 in which a second electromagnetic on-off valve 18 of normally-open type is interposed. As shown in FIGS. 3, 9 and 10, this output port 20 is connected to the main brake line 5 so that hydraulic fluid is supplied and discharged between the hydraulic pressure chamber 17 and the main brake line 5 whenever necessary. Incidentally, the hydraulic pressure modulator 6 shown in FIG. 4 and the hydraulic pressure modulator 6 shown in FIGS. 3, 9 and 10 are depicted as having a different internal path connecting from the hydraulic pressure chamber 17 to the main brake line 5. However, this difference is only for the illustrative purposes. Neither the actual structure nor the actual functions are significantly different between the hydraulic pressure modulator 6 shown in FIG. 4 and the hydraulic pressure modulator 6 shown in FIGS. 3, 9 and 10.

Furthermore, as shown in FIG. 4, the hydraulic pressure modulator 6 includes: a cam mechanism 21 for pushing up the piston 16 in the direction of the hydraulic pressure chamber 17; a return spring 22 for always pressing the piston 16 in the direction of the cam mechanism 21; and a electrically-operated motor 23 which serves as an electrically-operated actuator for operating the cam mechanism 21. This electrically-operated motor 23 is designed to be controlled by the controller 9 (see FIG. 1) so that the electrically-operated motor 23 is rotated reversibly.

With regard to the cam mechanism 21, a pair of cam rollers 25 and 26 are provided on the cam shaft 24, which is supported by bearing in the modulator body 14, in a way that the cam rollers 25 and 26 are eccentric to the rotational center of the cam shaft 24. The pair of cam rollers 25 and 26 are rotatably supported by a shaft 27 which is used commonly by the pair of cam rollers 25 and 26, the shaft 27 being provided outside the periphery of the cam shaft 24 in parallel with the cam shaft 24, with needle-shaped roller bearing 28 interposed between the shaft 27 and each of the cam rollers 25 and 26. Consequently, the cam rollers 25 and 26 are arranged outside the periphery of the cam shaft 24 in series in the shaft longitudinal direction. The piston 16 is urged by the return spring 22 so the end of the piston 16 is always forced to abut one cam roller 25. A lifter 29, which will be described later, is made to abut the other cam roller 26.

Moreover, a sector gear 30 is formed to be integral to an extremity of the cam shaft 24. This sector gear 30 is connected to a pinion gear 32 on the output shaft of the electrically-operated motor 23 through a speed reducing gear 31 (see FIG. 4 and FIG. 6(*b*)). Consequently, rotational torque produced by the electrically-operated motor 23 is transmitted to the cam shaft 24 through engagement of these gears, and the rotational movement of the cam shaft 24 by the torque is transmitted, as operating force, to the piston 16 through the cam roller 25. In addition, an angle sensor 33 is provided to another extremity of the cam shaft 24. The angle sensor 33 is designed to feed back to the controller 9 angle information concerning the cam shaft 24.

Figure 6A:
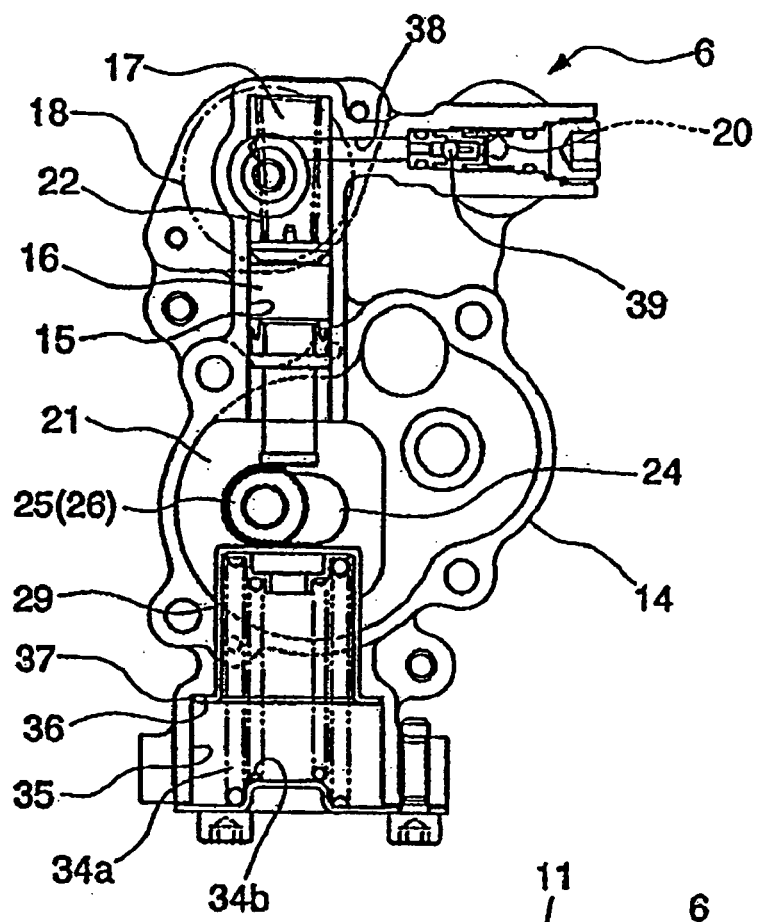
FIG. 6(a) is a sectional view of the hydraulic pressure modulator taken along the dashed line C-C in FIG. 4, which is not in operation, showing the piston in the neutral position.
Figure 6B:
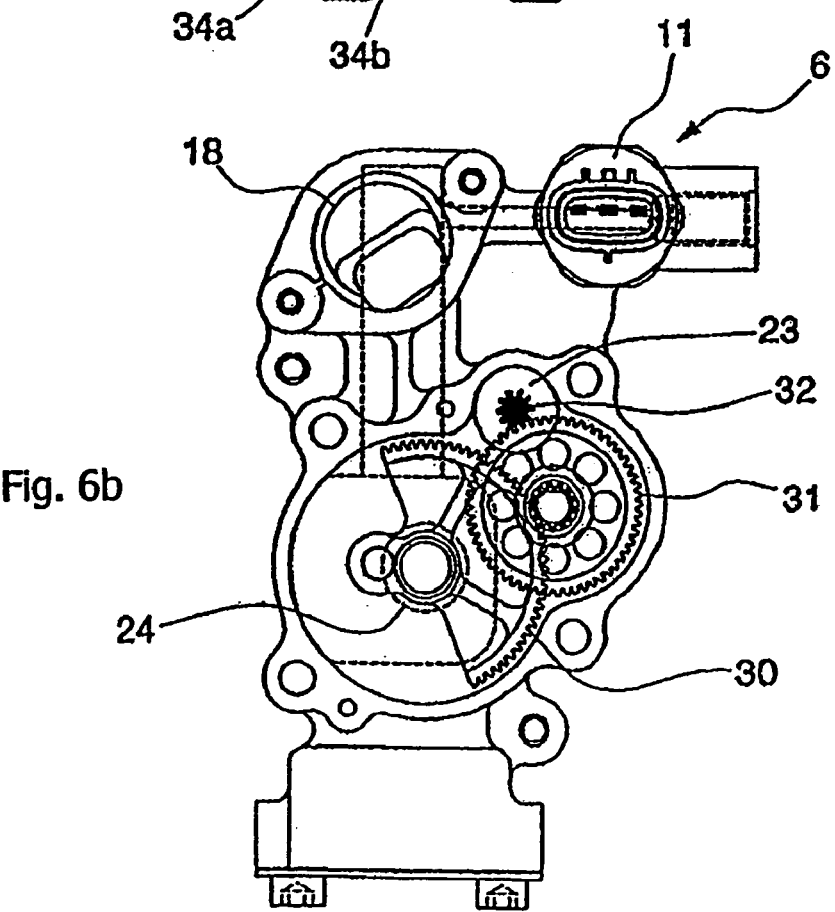
FIG. 6(b) is a side view of the hydraulic pressure modulator of FIG. 6(a) as seen from the direction of the arrow B in FIG. 4, showing a transmission part of an electrically-operated motor.

The cylinder 15 is divided in two areas by a position almost in the center of the cylinder 15, the position being defined as a neutral reference position. Thereby, operation of the piston 16 is controlled respectively in one and the other of the two divided areas. FIGS. 3, 4, 6(*a*) and 6(*b*) show a state which puts the piston 16 at the neutral reference position. While the piston 16 is in this state, the eccentric position of the cam roller 25 on the cam shaft 24 is almost orthogonal to the stroke direction of the piston 16. The electrically-operated motor 23 controls the energizing of the cam roller 25, and thereby controls the rotational movement of the eccentric position of the cam roller 25 so that the eccentric position moves in the up and down directions, as shown in the figures, whenever necessary.

In the hydraulic pressure modulator 6 according to the present embodiment, one area on the side of the hydraulic pressure chamber 17 which is expanded from the neutral reference position (on the lower side in FIG. 4) is designed to be used for ABS control, while the other area on the side of the hydraulic pressure chamber 17 which is reduced from the neutral reference position (on the upper side in FIG. 4) is designed to be used for CBS control. The ABS performs hydraulic pressure control ranging from the reducing of pressure against the main brake line 5 (the brake caliper 4) to the maintaining of the pressure and the increasing of the pressure once again. For this reason, use of the area on the side of the hydraulic pressure chamber 17 which is expanded by operation of the piston from the neutral reference position is preferable for the control. On the other hand, since the CBS performs hydraulic pressure control to actively supply hydraulic fluid to the main brake line (the brake caliper 4), use of the other area on the side of the hydraulic pressure chamber 17, which is decreased by operation of the piston from the neutral reference position, is preferable for the control. Incidentally, FIGS. 7(*a*), 7(*b*) and 9 show conditions where the CBS control is performed, and FIGS. 8(*a*), 8(*b*) and 10 show conditions where the ABS control is performed.

In the case of this hydraulic pressure modulator 6, the piston 16 is used for the ABS in one of the two areas into which the hydraulic pressure chamber 17 is divided by the neutral reference position, and the piston 16 is used for the CBS in the other of the two areas. Consequently, this eliminates the necessity of providing two different pistons, one for the ABS and the other for the CBS. Accordingly, in this hydraulic pressure modulator 6, the number of parts is reduced. Furthermore, the modulator itself can be produced in a smaller size and with a lighter weight.

Figures 7A, 7B:
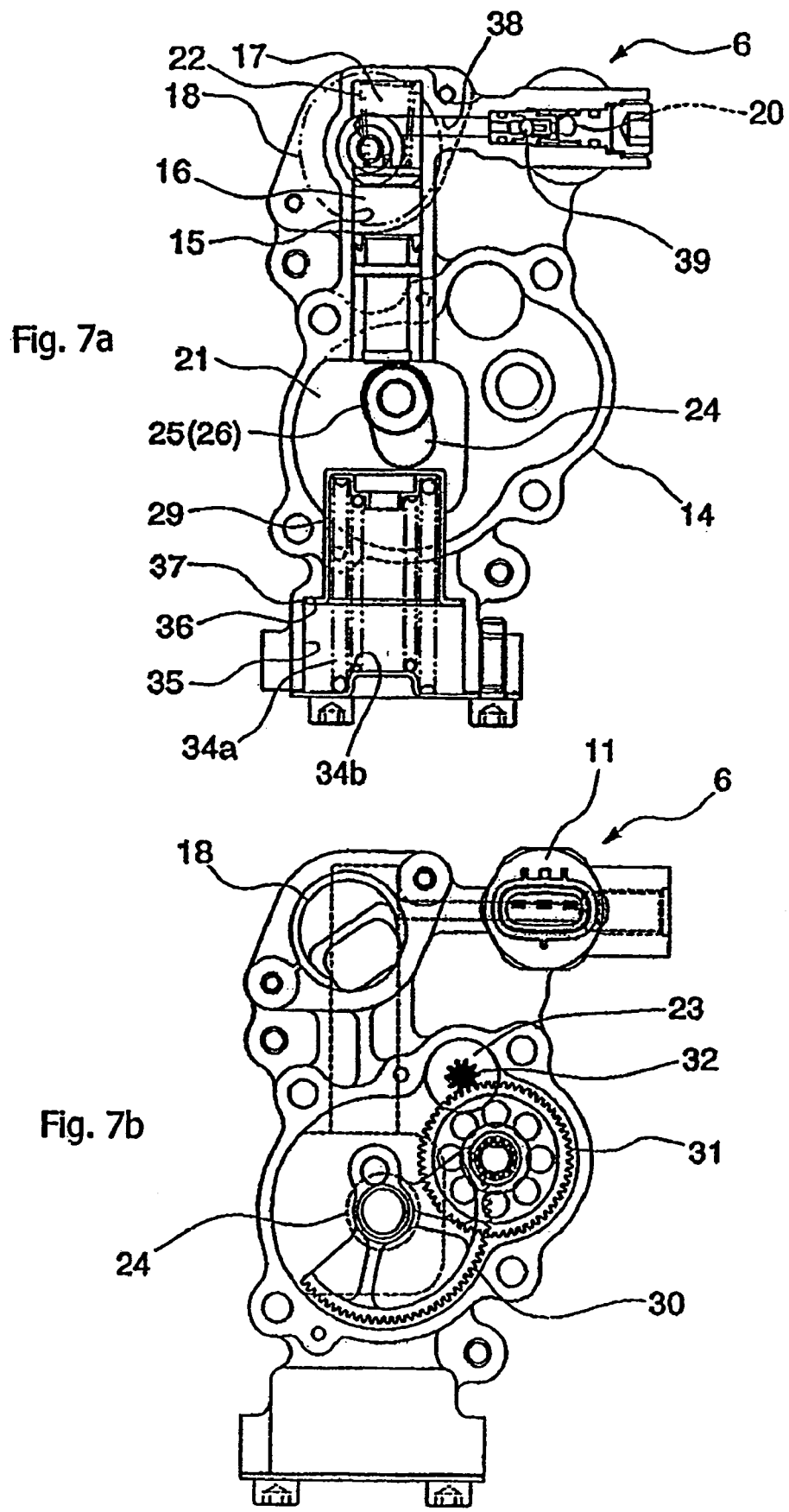
FIG. 7(a) is a sectional view of the hydraulic pressure modulator taken along the dashed line C-C in FIG. 4, showing the hydraulic pressure chamber reduced in sized due to the upward movement of the piston as found when the braking system is under CBS control.
FIG. 7(b) is a side view of the hydraulic pressure modulator of FIG. 7(a) as seen from the direction of the arrow B in FIG. 4, showing a transmission part of an electrically-operated motor.
Figure 8A:
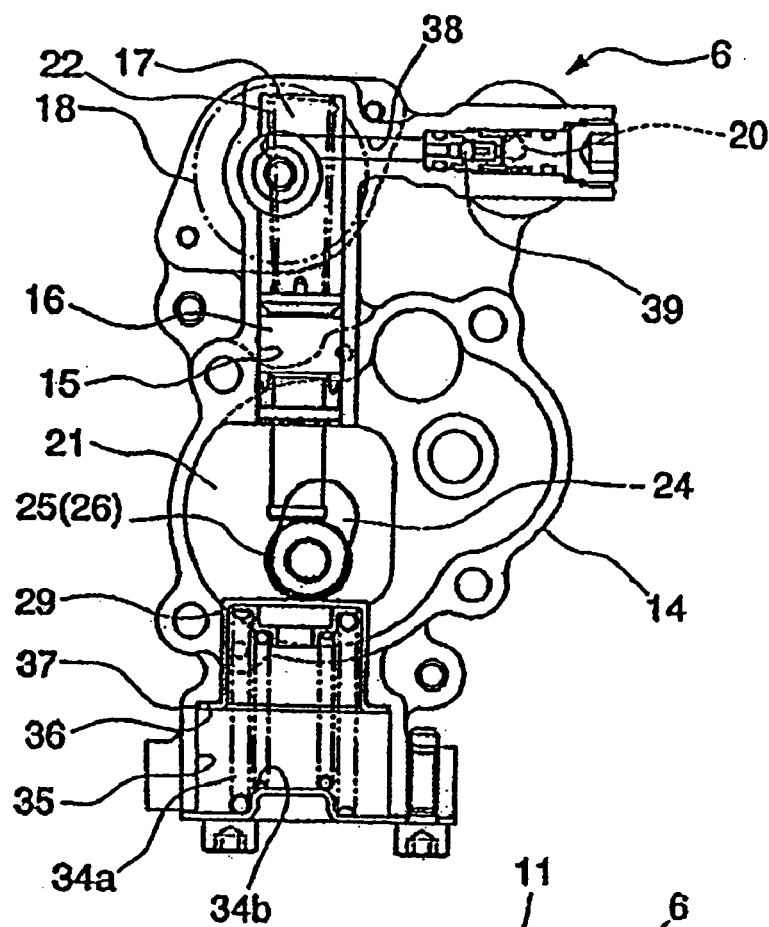
FIG. 8(a) is a sectional view of the hydraulic pressure modulator taken along the dashed line C-C in FIG. 4, showing the hydraulic pressure chamber expanded in sized due to the downward movement of the piston as found when the braking system is under ABS control.
Figure 8B:
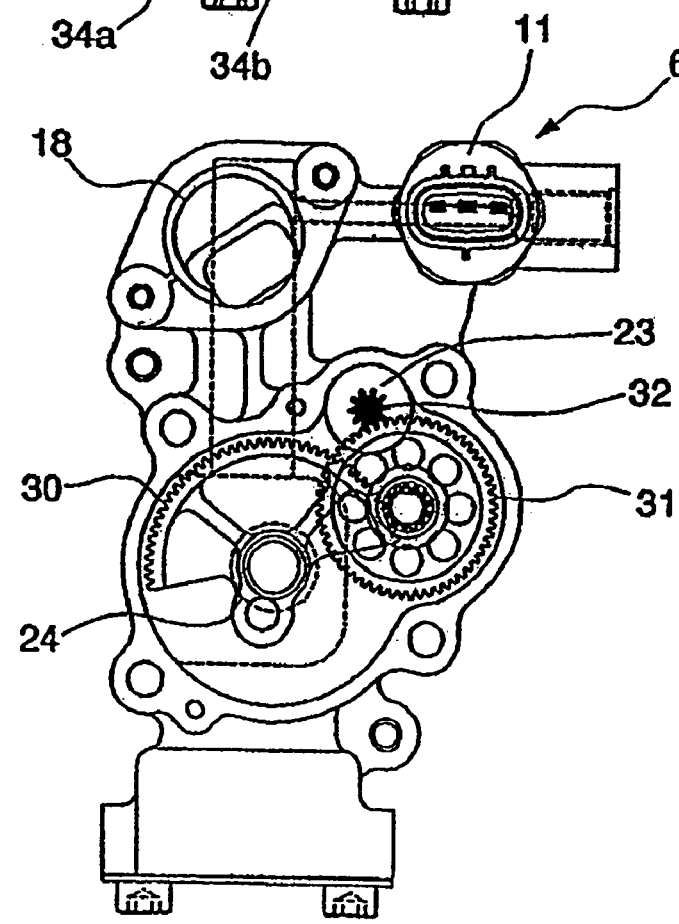
FIG. 8(b) is a side view of the hydraulic pressure modulator of FIG. 8(a) as seen from the direction of the arrow B in FIG. 4, showing a transmission part of an electrically-operated motor.

As shown in FIGS. 6 to 8, the lifter 29, which has a closed bottom, and which is shaped like a cylinder, is arranged in a position underneath the other cam roller 26 of the hydraulic pressure modulator 6 so that the lifter 29 can move back and forth. A force is applied to the lifter 29 in the direction of the cam roller 26 by a pair of backup springs 34*a* and 34*b* (energizing means) which have been arranged inside the lifter 29. The lifter 29 is arranged in an acceptance hole 35 with a level difference in the modulator body 14. At the opening edge of the lifter 29, a stopper flange 37, which can be made to abut on the step surface 36 of the acceptance hole 35, is formed so that the stopper flange 37 is integrated with the step surface 36. This stopper flange 37, along with the step surface of the acceptance hole 35, constitutes a stopper for controlling a position of the piston 16 to which a force is applied by the backup springs 34*a* and 34*b*. This stopper (the stopper flange 37 and the step surface 36) performs control so that a position of the piston 16 to which the maximum of force is applied by the backup springs 34*a* and 34*b* is equivalent to the neutral reference position.

The backup springs 34*a* and 34*b* apply a force to the piston 16 in the direction which decreases the hydraulic pressure chamber 17. The force applied to the piston 16 is optimally employed mainly while the electrically-operated motor 23 is not energized. The force applied to the piston 16 pushes back the piston position to the neutral reference position where the stopper functions, while the torque of the electrically-operated motor 23 does not function. Incidentally, with regard to the relative forces of the spring reaction forces of the backup springs 34*a* and 34*b* as well as the return springs 22, the spring reaction forces of the backup springs 34*a* and 34*b* are set to be the larger when the piston 16 is put at the neutral reference position. On one side, a spring reaction force is applied by the springs 34*a* and 34*b* to the piston 16 in the direction which returns the piston position to the neutral reference position. On the other side, a spring reaction force is applied by the spring 22 to the piston 16 in the direction which returns the piston position to the neutral reference position.

In addition, as shown in FIG. 4, the modulator body 14 is provided with a bypass path 38 which connects the hydraulic pressure chamber 17 with the output port 20 while bypassing the second electromagnetic on-off valve 18. This bypass path 38 is provided with a check valve 39 which allows the hydraulic fluid to flow in the direction from the hydraulic pressure chamber 17 to the output port 20.

The second electromagnetic on-off valve 18 in the main supply-discharge path 19 is of normally-closed type, and is opened only in the course of the ABS control and the CBS control under which the hydraulic fluid is supplied from the hydraulic pressure modulator 6 to the brake caliper 4. Although the second electromagnetic on-off valve 18 is being controlled in this manner, however, the supply-discharge path 19 is automatically blocked if the second electromagnetic on-off valve 18 is not energized for some reason. In this brake system, even if the second electromagnetic on-off valve 18 is closed in this manner, the flow of the hydraulic fluid in the direction from the hydraulic pressure chamber 17 to the main brake line 5 is secured by use of the bypass path 38 and the check valve 39.

Additionally, in this brake system, each pressure sensor 11 for detecting hydraulic pressure on the output side of the corresponding brake circuit is fitted into the modulator body 14 of the hydraulic pressure modulator 6. The detection part of the sensor is arranged so that the detection part of the sensor faces a position upstream of the second electromagnetic on-off valve 18 (a position in the direction of the output port 20) in the supply-discharge path 19 in the modulator body 14. Consequently, in this brake system, the pressure sensor 11, along with the hydraulic pressure modulator 6, can be arranged in an integrated block in a compact manner, and the hydraulic pressure on the output side of the brake circuit can be detected in a portion closer to the brake caliper 4.

In addition, in the case of the hydraulic pressure modulator 6 according to the present embodiment, the pressure sensor 11, which is a functional component being long in the axial direction, the electrically-operated motor 23 and the second electromagnetic on-off valve 18 are fitted into the modulator body 14 in parallel with one another, as shown in FIGS. 5 to 8. Consequently, the whole of the hydraulic pressure modulator 6 can be compact in size, thus making the hydraulic pressure modulator 6 very advantageous for being mounted onto a vehicle.

Figure 11:
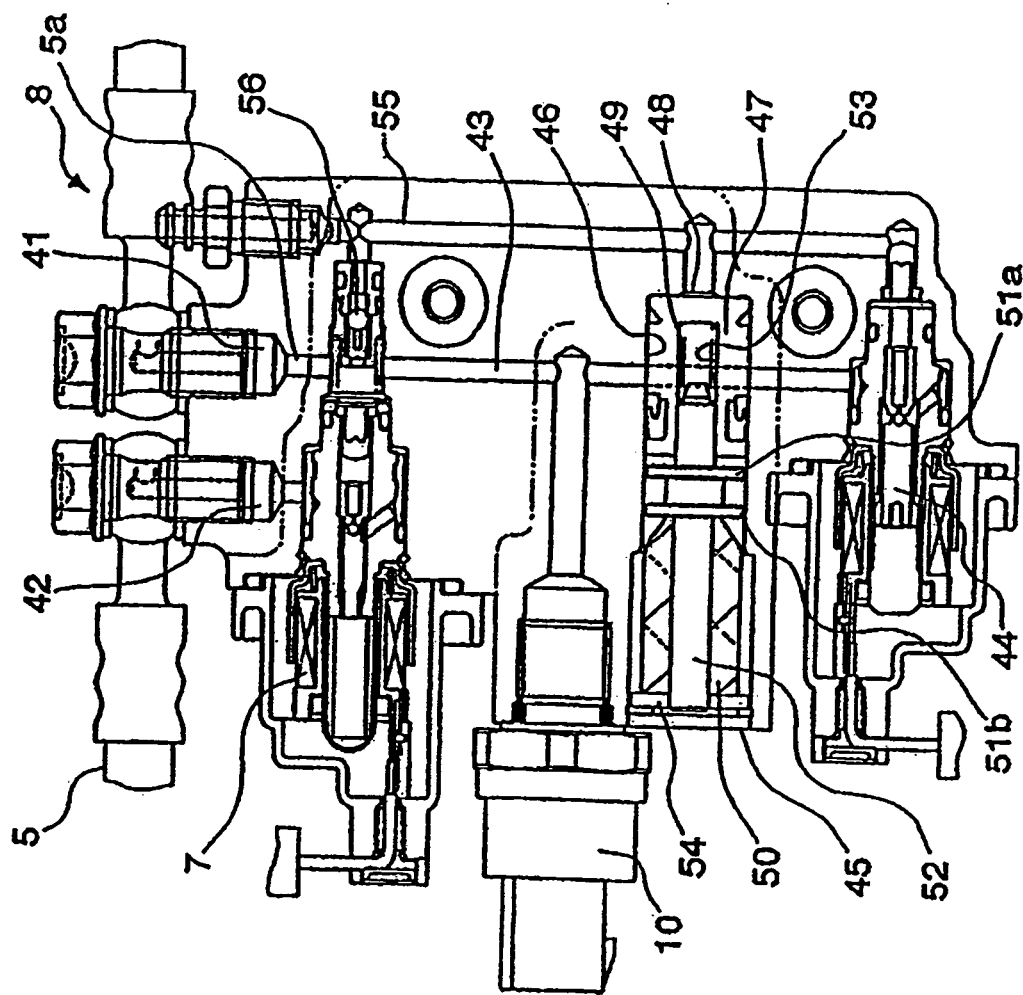
FIG. 11 is a sectional view of a reaction force modulator of the embodiment of FIG. 1.
Figure 12:
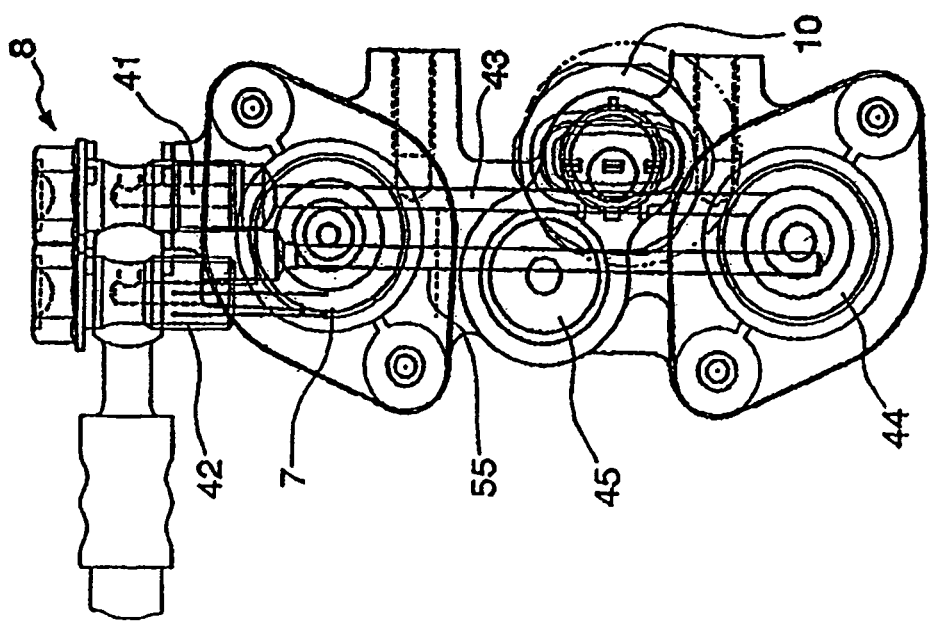
FIG. 12 is a passage arrangement view for the reaction force modulator of FIG. 11 as seen from the direction perpendicular to the section in FIG. 11.

Next, descriptions will be provided for a specific structure of a reaction force modulator 45 with reference to FIGS. 11 and 12. Incidentally, constituent components of the structure shown in FIGS. 11 and 12 are illustrated in a direction which is different from a direction in which constituent components of the structure shown FIGS. 3, 9 and 10 are illustrated. This difference is for illustration convenience.

The reaction force modulator 45 is fitted into a channel switch unit 8 shaped like an integrated block. A main brake constituting channel 5*a* constituting a part of the main brake line 5 is formed in a unit body 40 of this channel switch unit 8. One end of this main brake constituting channel 5*a* is designed to serve as an inlet port 41 communicating with the master cylinder 3, and the other end of the main brake constituting channel 5*a* is designed to be serve as an outlet port 42 communicating with the brake caliper 4. In addition, the first electromagnetic on-off valve 7 is integrally fitted into the unit body 40. Accordingly, the on-off operation part of this first electromagnetic on-off valve 7 is designed to open and close the main brake constituting channel 5*a*.

A branched channel 43 is provided in a position upstream (toward the master cylinder 3) of the first electromagnetic on-off valve 7 in the main brake constituting channel 5*a*. The reaction force modulator 45 is connected to this branched channel 43 via a third electromagnetic valve 44 which is of the normally-closed type. In common with the first electromagnetic on-off valve 7, the third electromagnetic on-off valve 44 is energized and controlled by the controller 9. While the CBS control is being performed, the third electromagnetic on-off valve 44 causes the master cylinder 3 and the reaction force modulator 45 to communicate with each other in a brake line connecting to a braking operation unit 2 which has been operated subsequent to the other braking operation unit 2. Incidentally, at this time, the first electromagnetic on-off valve 7 is energized, thereby closing the main brake constituting channel 5*a*.

Furthermore, the pressure sensor 10 on the input side of the brake circuit is provided upstream of the third electromagnetic on-off valve 44 (in the direction of the inlet port 41) in the branched channel 43. This pressure sensor 10 is integrally fitted into the unit body 40, and is arranged so that the pressure detection part of the pressure sensor 10 faces the inside of the branched channel. A portion upstream of the third electromagnetic on-off valve 44 in the branched channel 43 is always connected to the inlet port 41 whether the first electromagnetic on-off valve 7 opens or closes. Thereby, the pressure sensor 10 always can accurately detect the pressure in the vicinity of the master cylinder 3 in the brake circuit.

On the other hand, with regard to the reaction force modulator 45, a piston 47 is housed in a cylinder 46 which has been formed in the unit body 40 so that the piston 47 can move back and forth therein. A fluid chamber 48 to receive hydraulic fluid which has flowed therein from the master cylinder 3 is formed between the cylinder 46 and the piston 47. A metallic coil spring 49 and a deformed resin spring 50 are arranged in series on the back of the piston 47. These two springs 49 and 50 (elastic members) whose properties are different are designed to apply reaction forces to the piston 47.

Moreover, a guide rod 52, having a pair of flanges 51a and 51b located almost in the middle in the axial direction, is arranged in the back of the piston 47 in the cylinder 46. One extremity of the guide rod 52 is inserted into a housing hole 53 which has been formed in the middle of the back of the piston 47, and the other extremity of the guide rod 52 penetrates through the deformed resin spring 50 along the axis center of the deformed resin spring 50. The coil spring 49 is arranged between the housing hole 53 of the piston 47 and the former extremity of the guide rod 52, and is designed to generate a spring reaction force depending on the stroke of the piston 47 until the back of the piston 47 abuts the flange 51a of the guide rod 52. On the other hand, the deformed resin spring 50 is arranged between a thrust washer 54 arranged in the bottom of the cylinder 46 and the other flange 51b of the guide rod 52. The deformed resin spring 50 changes its shape depending on a retracting stroke of the guide rod 52, thereby generating reaction force and damping resistance (internal friction resistance) corresponding to its change in shape. Incidentally, the shape and material of the deformed resin spring 50 are determined depending on desired properties.

Generally, a spring constant of the deformed resin spring 50 is set to be larger than that of the coil spring 49. As a result, the coil spring 49 starts to change its shape earlier than the deformed resin spring 50 while the piston 16 executes a retracting stroke. In addition, the coil spring 49, made of metallic material, has linear spring properties, and the deformed resin spring 50 has histeresis properties (damping properties). For this reason, in the reaction force modulator 45, reaction force properties with moderate rise can be obtained mainly by use of the coil spring 49 in the initial phase of the retraction of the piston 16. In the final phase of the retraction, reaction force properties with sharp rise accompanying the damping properties can be obtained by use of the deformed resin spring 50.

In the case of this brake system, while the CBS control is performed, in the brake circuit leading to a braking operation unit which has been operated later than the other braking operation unit, hydraulic fluid is introduced into the reaction force modulator 45 from the master cylinder 3. At this time, the reaction force modulator 45 generates the multiple-staged reaction force by use of the two kinds of springs 49 and 50 as described above. Consequently, a braking operation having a smooth feel, which is similar to that given by the direct-operation-type brake system, can be obtained from this brake system, although this brake system has a very simple structure.

In addition, the unit body 40 of the reaction force modulator 45 is provided with a bypass path 55, which bypasses the third electromagnetic on-off valve 44. The bypass path 55 also connects the reaction force modulator 45 to the main brake constituting channel 5a at a portion upstream of the first electromagnetic on-off valve 7. Furthermore, the bypass path 55 is provided with a check valve 56 which allows hydraulic fluid to flow in the direction from the reaction force modulator 45 to the inlet port 41 (in the direction of the master cylinder 3). Consequently, even if the CBS control is released while hydraulic fluid is being introduced into the reaction force modulator 45, the hydraulic fluid in the reaction force modulator 45 is securely returned to the master cylinder 3 through the bypass path 55. Thereby, the piston 47 in the reaction force modulator 45 is returned to the initial position. For this reason, the next time the CBS control is resumed, a similar feeling of braking operation can be obtained.

Moreover, in the present embodiment, along with the reaction force modulator 45, the first electromagnetic on-off valve 7 which opens and closes the main brake line 5 is fitted into the channel switch unit 8. The first electromagnetic on-off valve 7 and the reaction force modulator 45 can be in a compact size as an integrated block. Furthermore, in the present embodiment, in addition to the first electromagnetic on-off valve 7 being fitted into the channel switch unit 8, the pressure sensor 10 on the input side and the third electromagnetic on-off valve 44 are also fitted into the same channel switch unit 8. This increases a degree of agglomeration of the functional components, and these functional components become advantageous for being mounted onto the vehicle.

In addition, in the aforementioned channel switch unit 8, the first and the third electromagnetic on-off valves 7 and 44, which are long in the axial direction, and the pressure sensor 10 are fitted into the unit body 40 so that the first and the third electromagnetic on-off valves 7 and 44 and the pressure sensor 10 are all in parallel with the reaction force modulator 45. This is advantageous for making the channel switch unit 8 itself in a compact size.

Furthermore, in the channel switch unit 8, the first electromagnetic on-off valve 7 is arranged forward in the axial direction, while the third electromagnetic on-off valve 44 is arranged backward in the axial direction. The channel from the inlet port 41 to the third electromagnetic on-off valve 44 (parts of the main brake constituting channel 5a and the branched channel 43) is formed in a straight line. This brings is advantageous since it is easy to manufacture the channel.

Based on the descriptions of the aforementioned components, a description will now be provided for operation of the whole of the brake system. In the following description, it is assumed that the mode-changing switch 13 is in a mode which allows the CBS.

While the vehicle is driven, if the rider operates one of the front wheel braking operation unit 2 and the rear wheel braking operation unit 2 earlier than the other, all of the first to third electromagnetic on-off valves 7, 44 and 18 remain unenergized, and hydraulic pressure to be generated in the master cylinder 3 is supplied directly to the brake caliper 4 in the brake circuit which has been operated earlier than the other.

Meanwhile, in the brake circuit which has been operated later than the other, all of the first to third electromagnetic on-off valves 7, 44 and 18 are energized. The main brake line 5 is cut off from the master cylinder 3 by the first electromagnetic on-off valve 7. Simultaneously, the master cylinder 3 and the reaction force modulator 45 are connected with each other by an opening operation of the third electromagnetic on-off valve 44. In addition, the hydraulic pressure modulator 6 and the main brake line 5 are connected with each other by an opening operation of the second electromagnetic on-off valve 18. This enables the rider to receive braking operation feel which has been reproduced artificially by the reaction force modulator 45. At the same time, fluctuation in hydraulic pressure due to operation of the hydraulic pressure modulator 6 is not transmitted to the rider. At this point, simultaneously with this, the electrically-operated motor 23 of the hydraulic pressure modulator 6 is operated, and the cam roller 25 pushes up the piston 16, thereby pressurizing hydraulic fluid in the hydraulic fluid chamber 17. As a result, hydraulic pressure in response to control by the electrically-operated motor 23 is supplied to the brake caliper 4 through the main brake line 5.

It should be noted that hydraulic pressure to be supplied from the hydraulic pressure modulator 6 to the brake caliper 4 is controlled in order to cause the hydraulic pressures of the front and rear wheels to satisfy a distribution ratio which has been set in advance. Furthermore, in this type of CBS control, if it is detected that a wheel on the side of the modulator which is operating is about to lock, the piston 16 is retracted by control of the electrically-operated motor 23 by the controller 9, thus reducing the braking pressure of the brake caliper 4. In this manner, the locking of the wheel is avoided.

Furthermore, in the brake circuit which has been operated earlier than the other brake circuit, if it is detected that the wheel is about to lock, the controller 9 causes the first electromagnetic on-off valve 7 to operate so that the communicative connection the master cylinder 3 and the brake caliper 4 is blocked. Simultaneously with this, the controller 9 causes the second electromagnetic on-off valve 18 to operate so that the hydraulic pressure modulator 6 is connected to the main brake line 5. In addition, the piston 16 is retracted from the neutral reference position by control of the electrically-operated motor 23. Thus, the controller 9 starts the ABS control. Thereby, braking pressure of the brake caliper 4 is reduced, and the locking of the wheel is avoided. Incidentally, at this time, the third electromagnetic on-off valve 44 in the channel switch unit 8 is closed, and the communicative connection the master cylinder 3 and the reaction force modulator 45 is blocked.

When the ABS control is started in this manner, and the piston 16 in the hydraulic pressure modulator 6 is retracted, eccentric rotation of the cam roller 25 on the cam shaft 24 compresses the backup springs 34a and 34b by means of the lifter 29. During a regular ABS operation, the uplifting operation of the piston 16 from this state is normally performed by power of the electrically-operated motor 23. However, if the electrically-operated motor 23 is not energized during the ABS control for some reason, the piston 16 is returned to the neutral reference position by forces of the backup springs 34a and 35b, and hydraulic fluid which has been withdrawn in the hydraulic pressure chamber 17 is returned to the main brake line 5. In addition, if the second electromagnetic on-off valve 18 is not energized simultaneously with this, the main supply-discharge path 19 in the hydraulic pressure modulator 6 is closed. However, hydraulic fluid in the hydraulic pressure chamber 17 is returned to the main brake line 5 through the bypass path 38 and the check valve 39.

Furthermore, once the vehicle is slowed through this series of braking operations, hydraulic pressure of the master cylinder 3 due to the rider's input functions on one wheel, and hydraulic pressure of the hydraulic pressure modulator 6 functions on the other wheel. However, when a certain length of time has passed after the vehicle slows, the hydraulic pressure modulator 6 (the electrically-operated motor 23) is shifted to the aforementioned electric current suppression mode which suspends the operation of the hydraulic pressure modulator 6 (the electrically-operated motor 23).

In this electric current suppression mode, first of all, the second electromagnetic on-off valve 18 of the hydraulic pressure modulator 6, which is pressurizing the brake caliper 4, is stopped from being energized. This suspends the operation of the electrically-operated motor 23 while the communicative connection the modulator 6 and the main brake line 5 is being blocked. At this time, hydraulic pressure which has been generated in the hydraulic pressure modulator 6 remains in the main brake line 5 and the brake caliper 4. Thereby, braking force is maintained by the hydraulic pressure.

Subsequently, the first and third electromagnetic on-off valves 7 and 44 in the channel switch unit 8 are stopped from being energized. Thereby, first of all, the third electromagnetic on-off valve 44 is caused to close so that the communicative connection the master cylinder 3 and the reaction force modulator 45 is blocked. Simultaneously, the first electromagnetic on-off valve 7 is caused to open, thereby causing the master cylinder 3 and the brake caliper 4 of the main brake line 5 to connect to each other. At this time, hydraulic pressure which has been generated in the hydraulic pressure modulator 6 remains in the main brake line 5. Thereby, the stroke on the side of the master cylinder 3 is maintained as it is.

The operation mode is shifted to the electric current suppression mode through this sequence. Thereby, the braking operation can be switched to braking operation to be performed by the master cylinder 3 while giving no feel of raggedness to the rider. In addition, even if the operation of the electrically-operated motor 23 is suspended in this manner, braking force is maintained securely, thus enabling no electricity to be consumed by the electrically-operated motor 23. Furthermore, wear, abrasion and the like of the motor brushes of the electrically-operated motor 23 can be reduced. Simultaneously, the electrical current consumption in each of the electromagnetic on-off valves 7, 44 and 18 can be curbed.

In addition, when the rider subsequently releases the braking operation, hydraulic fluid is returned from the brake caliper 4 to the master cylinder 3. Simultaneously, hydraulic fluid which remains in the reaction force modulator 45 is returned to the master cylinder 3 through the bypass path 55 and the check valve 56. In addition, the controller 9 causes the second electromagnetic on-off valve 18 to open when the hydraulic pressure on the input side of the brake circuit comes to be equal to the atmospheric pressure. Simultaneously, the controller 9 causes the electrically-operated motor 23 to operate so that the piston 16 in the hydraulic pressure modulator 6 is retracted to the neutral reference position.

The basic operations of this brake system have been described above. Conditions for starting the CBS control can be restricted by the controller 9 depending on an amount of braking operation (hydraulic pressure on the input side of the brake circuit), a vehicle speed and the like. For example, the CBS control may not be performed whereas each of the front and the rear wheels is braked only by hydraulic pressure of the master cylinder 3, while an amount of braking operation is smaller. In addition, the aforementioned CBS control by use of the hydraulic pressure modulator 6 may be performed, only while the amount of braking operation is larger than a certain level. Furthermore, if the front and rear wheel brakes are operated to a large extent at a time, the CBS may not be performed whereas the front and rear wheels are braked by hydraulic pressure of the master cylinder 3, thereby suppressing the electric current consumption.

Additionally, in the case of the brake system according to the present embodiment, a plurality of modes of control by the controller 9 are available, and the rider can choose an arbitrary mode of control by manual operation of the mode-changing switch 13.

Control modes which have been set in advance are as follows, for example.

(1) a sport mode: This is a mode of control in which the CBS control is performed only when the front wheel brake is operated. When the rear wheel brake is operated, braking operation only by use of hydraulic pressure of the master cylinder is performed.

(2) a touring mode: This is a mode of control in which the CBS control is performed when any one of the front wheel brake and the rear wheel brake is operated.

(3) a conventional mode: This is a mode of control in which braking operation only by use of hydraulic pressure of the master cylinder is performed when any one of the front wheel brake and the rear wheel brake is operated.

In this brake system, the rider can switch these modes of control from one to another whenever necessary depending on an environment where the vehicle is used, driving conditions of the vehicle and the like. Thereby, control which matches the rider's choice of braking operation can be pursued.

In addition, with regard to modes of control to be set in advance, a mode of control in which a distribution of hydraulic pressure between the front and rear wheel brakes depending on an amount of braking operations is fixed and a mode of control which has different conditions for starting the CBS control may be set in addition to the aforementioned control modes.

Figure 13A:
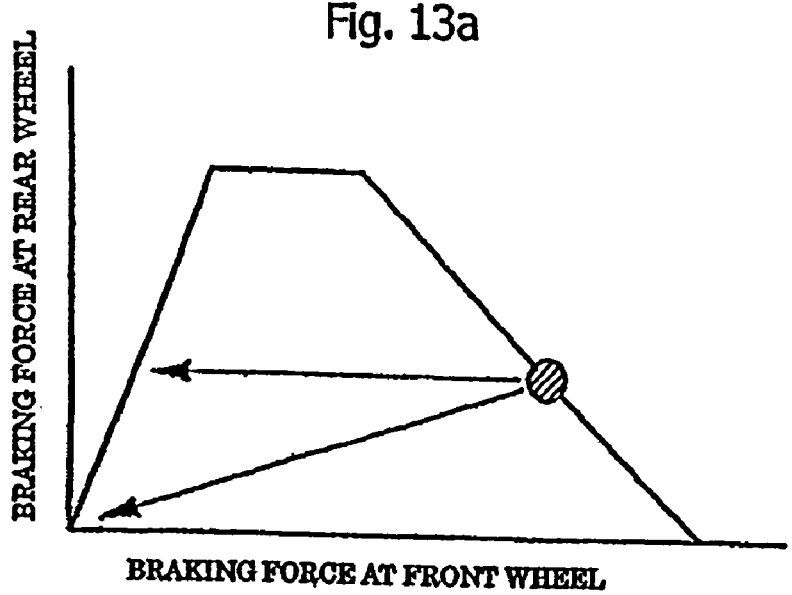
FIG. 13(a) is a braking force distribution characteristic view for front and rear wheels when a braking operation is performed to a front wheel in the embodiment of FIG. 1.
Figure 13B:
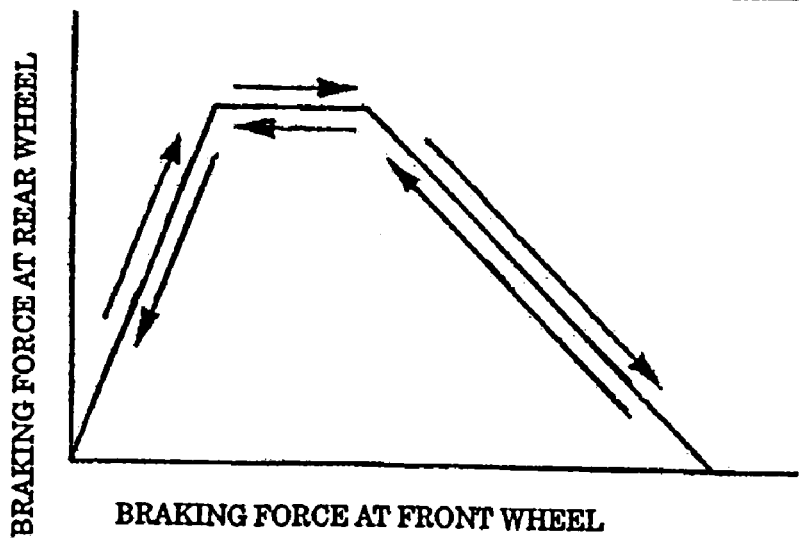
FIG. 13(b) is a braking force distribution characteristic view for front and rear wheels when a braking operation is performed to a front wheel in a prior art braking system.

In this brake system, in a case where the CBS control, which causes the rear wheel to move in response to a braking operation of the front wheel, is performed, a ratio of distribution of braking force of the front wheel to the rear wheel is designed to be different for a time when the front wheel braking force is increased (an amount of braking operation is increased) and for a time when the front wheel braking force is decreased (an amount of braking operation is decreased), as shown in FIG. 13(*a*).

Specifically, when the front wheel braking force is increased, hydraulic pressure is controlled so that the rear wheel braking force is increased gradually until the increased amount of the front wheel braking force reaches a certain level. Thereafter, the hydraulic pressure is controlled so that the rear wheel braking force is maintained at a constant level temporarily until the increased amount of the front wheel braking force reaches a set value. Thereafter, the hydraulic pressure is controlled so that the rear wheel braking force is decreased gradually after the increased amount of the front wheel braking force exceeds the set value. Under the conditions that the front wheel braking force is increased in this manner, the rear wheel braking force is controlled in this manner, thereby enabling braking efficiency in the initial phase of braking operation to be enhanced and inhibiting a reduction in vertical load of the rear wheel.

On the other hand, when the front wheel braking force is decreased, hydraulic pressure is controlled so that the rear wheel braking force is maintained as it is or is decreased gradually in response to the decrease of the front wheel braking force when the front wheel braking force goes under the set value (see arrows in FIG. 13(*a*)). Under the conditions that the front wheel braking force is decreased in this manner, the rear wheel braking force is prevented from being increased gradually so that increase in the slip ratio of the rear wheel is avoided, thereby providing the rider a braking operation having a smooth feel.

In this brake system, the braking force of the rear wheel is electrically controlled, thereby enabling the aforementioned control to be performed quickly and with high accuracy.

In addition, descriptions have been provided for the case where the rear wheel braking force is controlled so that the rear wheel braking force is maintained or reduced while the rider decreases the front wheel braking force. However, the time for which the braking operation of the rear wheel is performed, that is, the braking duration, can be controlled when the rider decreases the front wheel braking force.

Furthermore, with regard to this brake system, in a case where the CBS control which causes the rear wheel to move in response to a braking operation of the front wheel is performed, reduction in the vertical load of the rear wheel is judged as described below. Thereafter, distribution of braking force to the rear wheel is designed to be controlled so as to suppress reduction of the vertical load of the rear wheel.

Specifically, in this brake system, the reduction in the vertical load of the rear wheel is designed to be judged from a speed at which the vehicle runs, a hydraulic pressure to be supplied to the front wheel, and slip ratios of the front and rear wheels to be shown when an braking operation of the front wheel is performed. The amount of reduction of the vertical load of the rear wheel can be estimated for each vehicle (depending on the wheel base and the center of gravity of each vehicle) on a basis of the relationship between a vehicle speed and a braking force of the front wheel. In the present embodiment, however, in order to exclude conditions which make both the front and rear wheels slip similarly, an additional condition is considered. Specifically, it is judged whether the slip ratio of the front wheel is equal to, or lower than, a set value $\lambda_a$ and the slip ratio of the rear wheel is equal to, or higher than, another set value $\lambda_b$.

Figure 14:
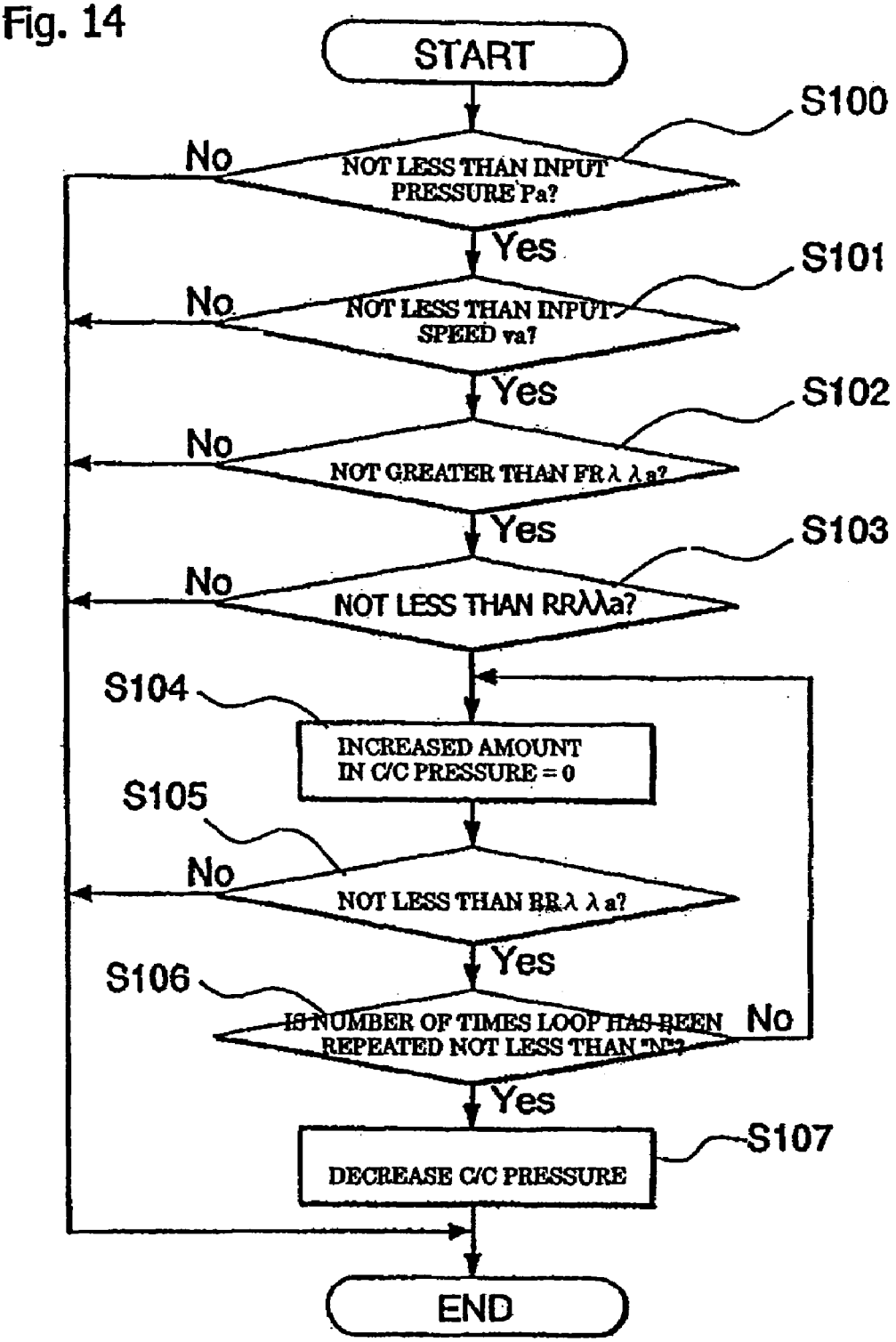
FIG. 14 is a flowchart showing the process for suppression of reduction of the rear wheel contact load as performed by the controller.

In this brake system, specifically, the reduction of the vertical load of the rear wheel is suppressed, for example, by performing the process shown in FIG. 14. FIG. 14 is a flowchart showing the process for suppression of reduction of the rear wheel contact load as performed by the controller.

In this process, it is judged in step 100 whether or not hydraulic pressure in the front wheel brake circuit is no less than a set pressure Pa, and it is judged in step 101 whether or not the vehicle speed is no less than a set speed va. If both conditions are satisfied, it is judged in step 102 whether or not the slip ratio of the front wheel is no more than, $\lambda_a$. If the slip ratio of the front wheel is no more than, $\lambda_a$, then it is judged in the following step 103 whether or not the slip ratio of the rear wheel is no more than, $\lambda_b$. If all of the four conditions are satisfied, it is determined that the vertical load of the rear wheel has started reducing. Accordingly, the present braking pressure of the rear wheel is maintained as it is in step 104, and it is judged in the following step 105, again, whether or not the slip ratio of the rear wheel is no less than, $\lambda_b$. If it is determined in step 105 that the slip ratio of the rear wheel is smaller than $\lambda_b$, the following steps are passed through (proceeds to the end). On the contrary, if it is determined that the slip ratio of the rear wheel is no less than, $\lambda_b$, it is judged in the following step 106 whether or not the number of times this loop of steps has been repeated is no less than a number N. If the number of repetitions does not reach N, the process returns to step 104, where the number of repetition is increased by one. In a case where this loop has been repeated N times (in other words, in a case where the slip ratio has still not become smaller than $\lambda_b$ after a predetermined lapse of time), the braking pressure of the rear wheel is reduced in step 107.

Figure 15:
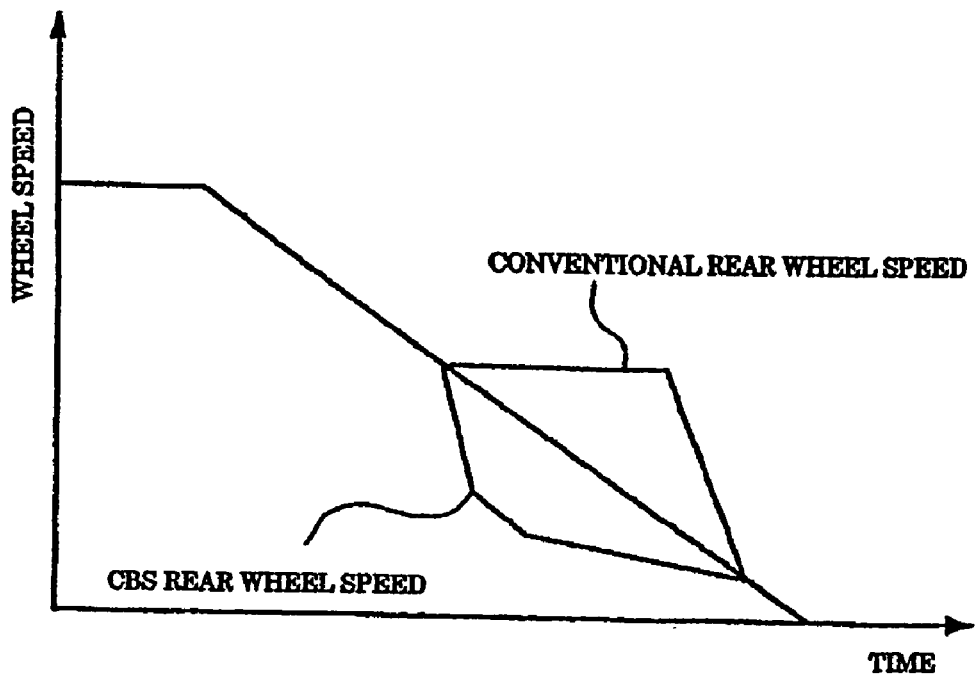
FIG. 15 is a rear wheel speed characteristic view comparing a brake system employing a CBS and that not employing a CBS, when a braking operation for a front wheel is performed.

Consequently, in this brake system, the control as described above prevents the vertical load of the rear wheel from continuing to decrease when the braking operation of the front wheel is performed. Incidentally, FIG. 15 shows comparative changes in speed of the rear wheel between a braking operation only by the front wheel and a braking operation by a CBS control to be performed when a braking operation of the front wheel is operated. In a conventional means for detecting the vertical load of a rear wheel to be adopted for a brake system which does not have the CBS, it is determined that the vertical load of the rear wheel has been reduced when the deceleration gradient of the rear wheel starts to decrease. On the contrary, in a brake system for which the CBS is adopted, the deceleration gradient will not become smaller, even if the vertical load of the rear wheel decreases. For this reason, conventional techniques have not been applied as it is for the brake system for which CBS is adopted. However, in the brake system according to the present embodiment, decrease in the vertical load of the rear wheel can be determined accurately in the aforementioned manner.

In addition, with regard to this brake system, when a CBS control which causes the front wheel to move in response to the braking operation of the rear wheel is performed, a distribution of braking force to the front wheel is designed to be controlled as follows.

Figure 16:
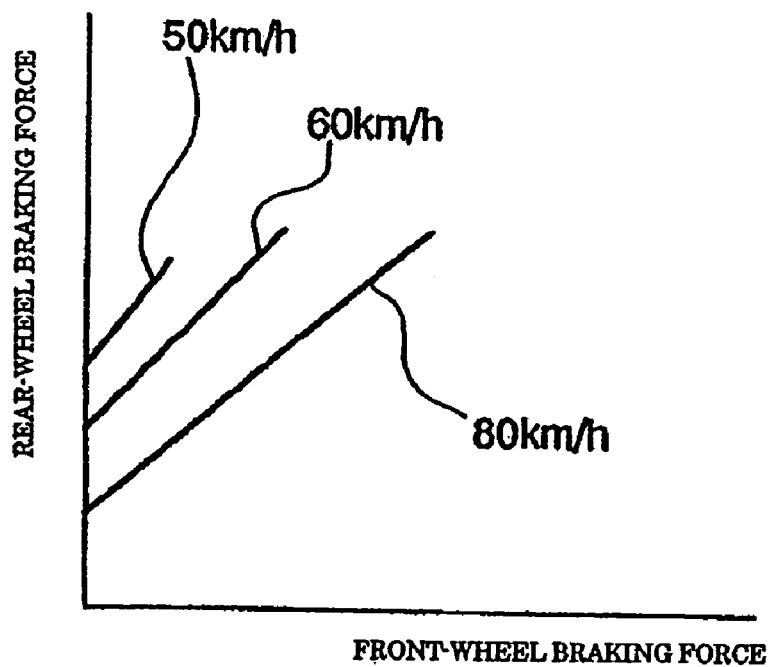
FIG. 16 is a braking force characteristic view for the front and rear wheels when a braking operation for a rear wheel is performed in the embodiment of FIG. 1.

Specifically, as shown in FIG. 16, characteristics of distribution of braking force of the front wheel to the rear wheel have been determined in advance for each vehicle speed of 50 km/h, 60 km/h and 80 km/h. When the braking operation of the rear wheel is started, the front wheel braking force is designed to be controlled from beginning to end by use of the distribution characteristics depending to a speed at which the vehicle is driven at the time the braking operation of the rear wheel is started. Thereby, if an amount of braking operation of the rear wheel remains constant, braking force corresponding to a certain distribution ratio is caused to function on the front wheel until the vehicle pulls up. With regard to the characteristics of distribution of braking force which have been determined in advance for each vehicle speed of 50 km/h, 60 km/h and 80 km/h, when the vehicle speed is, for example, 50 km/h, the front wheel braking force is maintained at zero until the rear wheel braking force (hydraulic pressure) reaches a certain value. After the rear wheel braking force has exceeded the certain value, the front wheel braking force increases in response to the increase in the rear wheel braking force. It is preferable that a point at which the distribution of braking force to the front wheel is started and a ratio of distribution of braking force to the front wheel be designed to increase respectively as the vehicle speed increases to 60 km/h, and to 80 km/h. Furthermore, if the vehicle speed is lower than a certain speed (for example, 50 km/h), no braking force is distributed to the front wheel.

Figure 17:
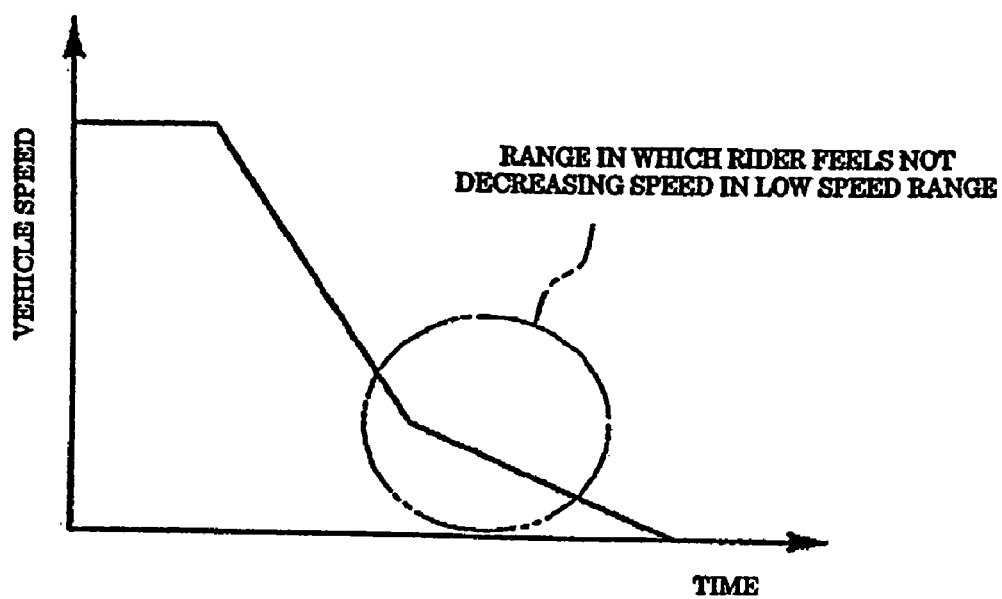
FIG. 17 is a vehicle speed decrement characteristic view when a braking operation for a rear wheel is performed in a prior art braking system, for a comparative example.

In the case of this brake system, when the CBS control of the rear wheel braking operation is performed, the braking force of the front wheel is designed to be controlled from beginning to end by use of characteristics of distribution of braking force corresponding to a speed at which the vehicle is driven when the braking operation is started. Accordingly, even if the rear wheel braking operation is performed while the vehicle is driven at high speed, deceleration gradient as shown in FIG. 17 will not abruptly change in the middle of the gradient. Consequently, the rider who is performing a braking operation does not percieve raggedness during the operation.

Furthermore, with regard to this brake system, when a braking operation is performed while the vehicle is driven at high speed, distribution of braking force to the front wheel becomes larger, thereby enhancing the braking efficiency. By contrast, when a braking operation is performed while the vehicle is driven at low speed, the distribution of braking force to the front wheel becomes smaller, and even becomes null. Thereby, braking force of the front wheel will not adversely affect the driving while the vehicle is driven through among other motor vehicles.

It should be noted that the characteristics of distribution of braking force, which have been determined in advance for each vehicle speed, are not limited to ones shown in FIG. 16, and that the characteristics are arbitrary. The characteristics may be set so that distribution of braking force to the front wheel is increased sharply after an amount of braking operation (braking force) of the rear wheel exceeds a certain value for each of vehicle speeds. In this case, quicker braking efficiency can be obtained when braking operation or the like for a sudden stop of the vehicle is performed.

While a working example of the present invention has been described above, the present invention is not limited to the working example described above, but various design alterations may be carried out without departing from the present invention as set forth in the claims.

We claim:

1. A brake system for a two-wheeled motor vehicle, the brake system comprising a front wheel brake circuit and a rear wheel brake circuit, wherein each of said front and rear wheel brake circuits comprises:

a wheel braking mechanism;

a brake operation lever for enabling a rider of the vehicle to operate the wheel braking mechanism;

a master cylinder operable in response to operation of the brake operation lever;

a main brake line which extends between the master cylinder and the wheel braking mechanism;

an electrically-operated actuator for use in generating hydraulic pressure;

a hydraulic pressure modulator corresponding to and selectively placeable in fluid communication with said wheel braking mechanism for transmitting the hydraulic pressure generated by the electrically-operated actuator to the wheel braking mechanism, the hydraulic pressure modulator being in fluid communication with the main brake line;

an electromagnetic on-off valve provided in the main brake line proximate the hydraulic pressure modulator, the electromagnetic on-off valve situated between the master cylinder and the wheel braking mechanism and provided for controlling fluid communication therebetween;

wherein the electromagnetic on-off valve and the electrically-operated actuator of each brake circuit are controllable depending on driving conditions and a braking operation of the motorcycle, wherein the wheel braking mechanisms of the two respective brake circuits are operable to apply a respective force in response to operation of an associated brake operation lever of one of the two brake circuits; and wherein, when a vehicle rider operates the operation unit of a selected one of said front and rear wheel brake circuits to make the selected circuit an active circuit, operation of the system is coordinated so that the wheel braking mechanism of the active circuit operates first, and then the electromagnetic on-off valve of the active circuit closes so that the wheel braking mechanism of the other circuit is operated by use of hydraulic pressure from the hydraulic pressure modulator of the other circuit.

2. A brake system for a motorcycle, the brake system comprising a front wheel brake circuit and a rear wheel brake circuit, wherein each of said front and rear wheel brake circuits comprises:

a wheel braking mechanism;

a brake operation lever for enabling a rider of the vehicle to operate the wheel braking mechanism;

a master cylinder operable in response to operation of the brake operation lever;

a main brake line which extends between the master cylinder and the wheel braking mechanism;

an electrically-operated actuator for use in generating hydraulic pressure;

a hydraulic pressure modulator corresponding to and selectively placeable in fluid communication with said wheel braking mechanism for transmitting the hydraulic pressure generated by the electrically-operated actuator to the wheel braking mechanism, the hydraulic pressure modulator being in fluid communication with the main brake line;

an electromagnetic on-off valve provided in the main brake line proximate the hydraulic pressure modulator, the electromagnetic on-off valve situated between the master cylinder and the wheel braking mechanism and provided for controlling fluid communication therebetween;

wherein the electromagnetic on-off valve and the electrically-operated actuator of each brake circuit are controllable depending on driving conditions and a braking operation of the motorcycle, wherein the wheel braking mechanisms of the two respective brake circuits are both operable to apply a respective force in response to operation of an associated brake operation lever of one of the two brake circuits;

wherein the hydraulic pressure modulator comprises a cylinder and a piston, and wherein the piston divides the cylinder into a first operation area and a second operation area, and when the piston is located generally in the center of the cylinder, this position defines a neutral reference position, the piston receives force from the electrically-operated actuator so that the piston moves back and forth in the cylinder, the piston is operable in the first operation area and the second operation area, respectively; and operation of the piston in the first operation area and operation of the piston in the second operation area, respectively, are used for different types of hydraulic pressure controls.

3. The brake system for a motorcycle according to claim 2, wherein the piston forms a hydraulic pressure chamber in the cylinder, the first operation area of the piston where the hydraulic pressure chamber is expanded by displacement of the piston from the neutral reference position is used for anti-lock control of a brake, and the second operation area of the piston is used for control of causing the wheel braking mechanism of the two respective brake circuits to move in response to an operation of a brake operation lever of one of the two respective brake circuits.

4. The brake system for a motorcycle according to claim 3, wherein the hydraulic pressure modulator comprises a biasing member which applies a force to the piston in a direction which deceases the volume of the hydraulic pressure chamber, and a stopper for limiting the displacement of the piston by the energizing means at the neutral reference position, wherein the energizing means and the stopper return the piston to the neutral reference position when the electrically-operated actuator of the hydraulic pressure modulator is held in suspension in the course of the anti-lock brake control.

5. The brake system for a motorcycle according to claim 4, wherein an electromagnetic on-off valve of the normally-closed type is provided between the hydraulic pressure chamber and the main brake line, a bypass path is provided which bypasses the electromagnetic on-off valve and which connects the hydraulic pressure chamber to the main brake line, and the bypass path comprises a check valve which allows hydraulic fluid to flow from the hydraulic pressure chamber to the main brake line.

6. In a motorcycle of the type having a front wheel and a rear wheel, the improvement comprising a brake system which comprises an antilock braking system, a combined braking system including front and rear wheel brake circuits associated with the front and rear wheels, respectively, and a hydraulic pressure modulator, wherein the hydraulic pressure modulator selectively supplies hydraulic pressure to both the antilock braking system and the combined braking system; and wherein the hydraulic pressure modulator is movable to a first operative position wherein it supplies hydraulic pressure to the antilock braking system and to a second operative position wherein it supplies hydraulic pressure to the combined braking system.

7. The motorcycle of claim 6, wherein the hydraulic pressure modulator comprises:

a cylinder;

a piston housed within the cylinder;

a hydraulic fluid chamber formed between the piston and the cylinder; and an electrically-operated actuator;

wherein the actuator is operatively connected to the piston so as to be able to displace the piston within the cylinder, and so as to thereby control the generation of hydraulic pressure within the brake system, said piston of the hydraulic pressure modulator is movable to the first operative position in which the hydraulic pressure is supplied to the antilock braking system and the second operative position in which the hydraulic pressure is supplied to the combined braking system.

8. The motorcycle of claim 6, wherein the hydraulic pressure modulator comprises:
a cylinder;
a piston housed within the cylinder;
a hydraulic fluid chamber formed between the piston and the cylinder; and
an electrically-operated actuator,
wherein the actuator is operatively connected to the piston so as to displace the piston within the cylinder,
and wherein:
when the piston is positioned generally at the center of the cylinder, the piston is in a neutral reference position;
when the piston is displaced from the neutral reference position so as to expand the hydraulic fluid chamber, the brake system provides anti-lock brake control; and
when the piston is displaced from the neutral reference position so as to compress the hydraulic fluid chamber, the brake system provides combined brake control.

9. The motorcycle of claim 6, wherein the hydraulic pressure modulator comprises:
a cylinder;
a piston housed within the cylinder;
a hydraulic fluid chamber formed between the piston and the cylinder; and
an electrically-operated actuator operatively connected to the piston so as to displace the piston within the cylinder,
an elastic member operatively connected to the piston so as to urge the piston to move within the cylinder in a direction which reduces the volume of the hydraulic fluid chamber,
a stop member operatively connected to the elastic member so as to limit the elastic member's displacement of the piston,
wherein when the piston is positioned generally at the center of the cylinder the piston is in a neutral reference position;
and wherein the stop member is configured to allow the elastic member to urge the piston to return to the neutral reference position when the piston is not actuated by the electrically operated actuator.

10. The motorcycle of claim 6, wherein the front wheel brake circuit and the rear wheel brake circuit are independent of each other, each brake circuit comprising:
a brake operation lever;
a master cylinder operable to move in response to operation of the brake operation lever;
wheel braking mechanism for applying a braking force to a corresponding wheel by hydraulic pressure operation;
a main brake line which connects the master cylinder to the wheel braking mechanism;
the hydraulic pressure modulator which is operable to cause an electrically-operated actuator to generate hydraulic pressure corresponding to driving conditions and operation of the brake operation lever, the hydraulic pressure modulator supplying the hydraulic pressure to the main brake line and discharging the hydraulic pressure from the main brake line, the hydraulic pressure modulator connected with the main brake line; and
an electromagnetic on-off valve provided in a position toward the master cylinder relative to a portion in the main brake line where the main brake line and the hydraulic pressure modulator are connected with each other, the electromagnetic on-off valve controlling the communicative connection and cutoff between the master cylinder and the wheel braking mechanism,
a bypass path provided between the hydraulic pressure modulator and the master cylinder, the bypass path circumventing the electromagnetic on-off valve and comprising a check valve, wherein the check valve permits excess hydraulic fluid within the hydraulic pressure modulator to discharge to the master cylinder when the electromagnetic on-off valve is closed.

11. A method of operating a brake system on a two-wheeled motor vehicle, the brake system comprising a front wheel brake circuit and a rear wheel brake circuit, wherein each of said front arid rear wheel, brake circuits comprises:
a wheel braking mechanism;
a brake operation lever for enabling a rider of the vehicle to operate the wheel braking mechanism;
a master cylinder operable in response to operation of the brake operation lever;
a main brake line which extends between the master cylinder and the wheel braking mechanism;
an electrically-operated actuator for use in generating hydraulic pressure;
a hydraulic pressure modulator corresponding to and selectively placeable in fluid communication with said wheel braking mechanism for transmitting the hydraulic pressure generated by the electrically-operated actuator to the wheel braking mechanism, the hydraulic pressure modulator being in fluid communication with the main brake line;
an electromagnetic on-off valve provided in the main brake line proximate the hydraulic pressure modulator, the electromagnetic on-off valve situated between the master cylinder and the wheel braking mechanism and provided for controlling fluid communication therebetween;
wherein the electromagnetic on-off valve and the electrically-operated actuator of each brake circuit are controllable depending on driving conditions and a braking operation of the motorcycle,
wherein the wheel braking mechanisms of the two respective brake circuits are operable to apply a respective force in response to operation of an associated brake operation lever of one of the two brake circuits; and
wherein said method comprises the steps of:
operating the wheel braking mechanism of an active circuit first when a vehicle rider operates the operation unit of a selected one of said front and rear wheel brake circuits to make the selected circuit an active circuit, and
closing the electromagnetic on-off valve of the active circuit so that the wheel braking mechanism of the other circuit is operated by use of hydraulic pressure from the hydraulic pressure modulator.

* * * * *